US012713367B2

(12) United States Patent
Ifergan et al.

(10) Patent No.: US 12,713,367 B2
(45) Date of Patent: Aug. 18, 2026

(54) METHODS FOR COMMUNICATING SYNCHRONIZATION SIGNALS USING CYCLIC SHIFTS

(71) Applicant: QUALCOMM Incorporated, San Diego, CA (US)

(72) Inventors: Itay Ifergan, Hod Hasharon (IL); Peer Berger, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 523 days.

(21) Appl. No.: 18/323,804

(22) Filed: May 25, 2023

(65) Prior Publication Data

US 2024/0397454 A1 Nov. 28, 2024

(51) Int. Cl.

*H04W 72/04* (2023.01)
*H04W 56/00* (2009.01)
*H04W 88/04* (2009.01)

(52) U.S. Cl.

CPC .......... *H04W 56/001* (2013.01); *H04W 88/04* (2013.01)

(58) Field of Classification Search

CPC .... H04W 56/001; H04W 88/04; H04L 27/261
See application file for complete search history.

(56) References Cited

U.S. PATENT DOCUMENTS 10,341,946 B2 * 7/2019 Abedini ................ H04W 48/16
11,588,569 B2 2/2023 Yoon
2018/0083766 A1 * 3/2018 Cho .................... H04J 13/0062
2019/0215849 A1 * 7/2019 Ye ......................... H04L 5/0094

(Continued)

FOREIGN PATENT DOCUMENTS

IN 202027014679 10/2020
KR 10-2021-0042940 A 4/2021
WO WO-2009155882 A1 * 12/2009 ......... H04L 27/2662

OTHER PUBLICATIONS

NPL Fujitsu, R1-1910138, Discussion of sidelink synchronization mechanism for NR V2X, 3GPP TSG RAN WG1 #98bis, Chongqing, China, Oct. 14-20, 2019 (Year: 2019).*

(Continued)

*Primary Examiner* — Mahbubul Bar Chowdhury

(74) *Attorney, Agent, or Firm* — QUALCOMM Incorporated

(57) ABSTRACT

Methods, systems, and devices for wireless communications are described. A user equipment (UE) may periodically transmit one or more sidelink synchronization signals (SLSSs), which may enable other UEs to synchronize communications with the UE. A UE may apply a cyclic shift to one or more symbols of an SLSS in the time domain, which may differentiate SLSSs transmitted by different UEs and/or reduce destructive interference between SLSSs. In some examples, a receiving UE may apply one or more cyclic shift hypothesis to incoming SLSSs and perform one or more operations to evaluate an accuracy of each hypothesis. In some examples, a receiving UE may perform an autocorrelation operation to receive SLSSs (e.g., to detect the cyclic shift) or otherwise evaluate the accuracy for various cyclic shift hypothesis. A UE may determine if SLSSs are transmitted by a single UE or multiple UEs, which may improve communication reliability for SLSSs.

23 Claims, 13 Drawing Sheets

(56) References Cited

U.S. PATENT DOCUMENTS

| | | | | |
|---|---|---|---|---|
| 2020/0015214 | A1* | 1/2020 | Si | H04W 56/0015 |
| 2020/0280961 | A1* | 9/2020 | Lee | H04W 4/40 |
| 2021/0014023 | A1* | 1/2021 | Zheng | H04L 5/0044 |
| 2021/0167883 | A1* | 6/2021 | Yoon | H04J 11/0076 |
| 2021/0307095 | A1* | 9/2021 | Kim | H04W 76/14 |
| 2021/0314886 | A1 | 10/2021 | Ko et al. | |
| 2021/0368460 | A1 | 11/2021 | Fakoorian et al. | |
| 2021/0377893 | A1 | 12/2021 | Khoryaev et al. | |
| 2022/0140967 | A1 | 5/2022 | Khoryaev et al. | |
| 2022/0201629 | A1* | 6/2022 | Ko | H04W 56/00 |
| 2022/0225250 | A1* | 7/2022 | Ko | H04W 56/001 |
| 2022/0360353 | A1* | 11/2022 | Pajukoski | H04J 13/107 |
| 2022/0407638 | A1 | 12/2022 | Chae et al. | |

OTHER PUBLICATIONS

NPL, Huawei, R1-1906012, Sidelink synchronization mechanisms for NR V2X, 3GPP TSG RAN WG1 Meeting #97, Reno, USA, May 13-17, 2019, (Section 7, Proposal 7) (Year: 2019).*

International Search Report and Written Opinion—PCT/US2024/029552—ISA/EPO—Sep. 13, 2024.

Nokia, et al., "Discussion on NR V2X Sidelink Synchronization Mechanism", 3GPP TSG-RAN WG1 Meeting #99, R1-1911955, 3rd Generation Partnership Project, Mobile Competence Centre, 650, Route Des Lucioles, F-06921 Sophia-Antipolis Cedex, France, vol. RAN WG1, No. Reno, USA, Oct. 18, 2019-Oct. 22, 2019, Nov. 9, 2019, 15 Pages, XP051823136, Section 3.1, p. 6.

* cited by examiner

200

600

METHODS FOR COMMUNICATING SYNCHRONIZATION SIGNALS USING CYCLIC SHIFTS

FIELD OF TECHNOLOGY

The following relates to wireless communications, including methods for communicating synchronization signals using cyclic shifts.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support methods for communicating synchronization signals using cyclic shifts. A user equipment (UE) in a network supporting sidelink communications between UEs (e.g., a cellular vehicle-to-everything (CV2X) network) may periodically transmit one or more sidelink synchronization signals (SLSSs), which may enable other UEs to synchronize communications with the UE. A UE may select a cyclic shift to apply to one or more symbols of an SLSS in the time domain, which may differentiate SLSSs transmitted by different UEs (e.g., different UEs may select different cyclic shifts) and/or reduce destructive interference that may otherwise occur between SLSSs. In some examples, a receiving UE may apply one or more cyclic shift hypothesis (e.g., assumptions) to incoming SLSSs and perform one or more operations to evaluate an accuracy of each hypothesis. In some examples, a receiving UE may perform an autocorrelation operation to receive SLSSs (e.g., to detect the cyclic shift) or otherwise evaluate the accuracy for various cyclic shift hypothesis. A UE may determine if SLSSs are transmitted by a single UE (e.g., with or without transmit diversity) or multiple UEs, which may improve communication reliability for SLSSs.

A method for wireless communication at a first UE is described. The method may include transmitting a first portion of a synchronization signal, where the first portion of the synchronization signal includes a sequence, transmitting a second portion of the synchronization signal including the sequence, where a cyclic shift is applied to the sequence for the second portion of the synchronization signal that shifts the second portion of the synchronization signal relative to the first portion of the synchronization signal, and receiving communications from a second UE, the receiving based on transmitting the first and second portions of the synchronization signal.

An apparatus for wireless communication at a first UE is described. The apparatus may include a processor, memory coupled with the processor, and instructions stored in the memory. The instructions may be executable by the processor to cause the apparatus to transmit a first portion of a synchronization signal, where the first portion of the synchronization signal includes a sequence, transmit a second portion of the synchronization signal including the sequence, where a cyclic shift is applied to the sequence for the second portion of the synchronization signal that shifts the second portion of the synchronization signal relative to the first portion of the synchronization signal, and receive communications from a second UE, the receiving based on transmitting the first and second portions of the synchronization signal.

Another apparatus for wireless communication at a first UE is described. The apparatus may include means for transmitting a first portion of a synchronization signal, where the first portion of the synchronization signal includes a sequence, means for transmitting a second portion of the synchronization signal including the sequence, where a cyclic shift is applied to the sequence for the second portion of the synchronization signal that shifts the second portion of the synchronization signal relative to the first portion of the synchronization signal, and means for receiving communications from a second UE, the receiving based on transmitting the first and second portions of the synchronization signal.

A non-transitory computer-readable medium storing code for wireless communication at a first UE is described. The code may include instructions executable by a processor to transmit a first portion of a synchronization signal, where the first portion of the synchronization signal includes a sequence, transmit a second portion of the synchronization signal including the sequence, where a cyclic shift is applied to the sequence for the second portion of the synchronization signal that shifts the second portion of the synchronization signal relative to the first portion of the synchronization signal, and receive communications from a second UE, the receiving based on transmitting the first and second portions of the synchronization signal.

Some examples of the method, apparatuses, and non-transitory computer-readable medium described herein may further include operations, features, means, or instructions for transmitting the first portion of the synchronization signal includes transmitting the first portion of the synchronization signal without applying the cyclic shift to the sequence during the first portion of the synchronization signal.

Some examples of the method, apparatuses, and non-transitory computer-readable medium described herein may further include operations, features, means, or instructions for generating the cyclic shift using a function, where an output of the function includes the cyclic shift.

In some examples of the method, apparatuses, and non-transitory computer-readable medium described herein, one or more bits associated with communications previously transmitted by the first UE, an identifier for the first UE, or both, may be inputs for the function.

In some examples of the method, apparatuses, and non-transitory computer-readable medium described herein, the output of the function includes a pseudo-random output.

Some examples of the method, apparatuses, and non-transitory computer-readable medium described herein may further include operations, features, means, or instructions for generating the cyclic shift based on one or more bits of a physical sidelink control channel communication previously transmitted by the first UE, an identifier for the first UE, or both.

A method for wireless communication at a first UE is described. The method may include generating a synchronization signal for transmission based on a sequence, the synchronization signal including a first primary synchronization signal symbol and a second primary synchronization signal symbol, transmitting the synchronization signal, where transmitting the synchronization signal includes applying a cyclic shift in the time-domain to the first primary synchronization signal symbol, the second primary synchronization signal symbol, or both, and receiving communications from a second UE, the receiving based on transmitting the synchronization signal.

An apparatus for wireless communication at a first UE is described. The apparatus may include a processor, memory coupled with the processor, and instructions stored in the memory. The instructions may be executable by the processor to cause the apparatus to generate a synchronization signal for transmission based on a sequence, the synchronization signal including a first primary synchronization signal symbol and a second primary synchronization signal symbol, transmit the synchronization signal, where transmitting the synchronization signal includes applying a cyclic shift in the time-domain to the first primary synchronization signal symbol, the second primary synchronization signal symbol, or both, and receive communications from a second UE, the receiving based on transmitting the synchronization signal.

Another apparatus for wireless communication at a first UE is described. The apparatus may include means for generating a synchronization signal for transmission based on a sequence, the synchronization signal including a first primary synchronization signal symbol and a second primary synchronization signal symbol, means for transmitting the synchronization signal, where transmitting the synchronization signal includes applying a cyclic shift in the time-domain to the first primary synchronization signal symbol, the second primary synchronization signal symbol, or both, and means for receiving communications from a second UE, the receiving based on transmitting the synchronization signal.

A non-transitory computer-readable medium storing code for wireless communication at a first UE is described. The code may include instructions executable by a processor to generate a synchronization signal for transmission based on a sequence, the synchronization signal including a first primary synchronization signal symbol and a second primary synchronization signal symbol, transmit the synchronization signal, where transmitting the synchronization signal includes applying a cyclic shift in the time-domain to the first primary synchronization signal symbol, the second primary synchronization signal symbol, or both, and receive communications from a second UE, the receiving based on transmitting the synchronization signal.

In some examples of the method, apparatuses, and non-transitory computer-readable medium described herein, transmitting the synchronization signal may include operations, features, means, or instructions for applying the cyclic shift to the sequence during the first primary synchronization signal symbol and the second primary synchronization signal symbol.

In some examples of the method, apparatuses, and non-transitory computer-readable medium described herein, transmitting the synchronization signal may include operations, features, means, or instructions for applying the cyclic shift to the synchronization signal for one of the first primary synchronization signal symbol or the second primary synchronization signal symbol, where applying the cyclic shift shifts the synchronization signal for the one of the first primary synchronization signal symbol or the second primary synchronization signal symbol relative to the other of the first primary synchronization signal symbol or the second primary synchronization signal symbol.

Some examples of the method, apparatuses, and non-transitory computer-readable medium described herein may further include operations, features, means, or instructions for generating the cyclic shift using a function, where an output of the function includes the cyclic shift.

In some examples of the method, apparatuses, and non-transitory computer-readable medium described herein, one or more bits associated with a sidelink broadcast channel communications or sidelink control channel communications may be inputs for the function.

In some examples of the method, apparatuses, and non-transitory computer-readable medium described herein, the output of the function includes a pseudo-random output.

Some examples of the method, apparatuses, and non-transitory computer-readable medium described herein may further include operations, features, means, or instructions for generating the cyclic shift based on one or more bits of a physical sidelink control channel communication previously transmitted by the first UE, an identifier for the first UE, or both.

A method for wireless communication at a first UE is described. The method may include receiving, from a second UE, a first portion of a synchronization signal, receiving, from the second UE, a second portion of the synchronization signal, performing one or more operations to determine a cyclic shift applied to the second portion of the synchronization signal, where the second portion of the synchronization signal is shifted relative to the first portion of the synchronization signal, and transmitting communications to the second UE based on receiving the first and second portions of the synchronization signal.

An apparatus for wireless communication at a first UE is described. The apparatus may include a processor, memory coupled with the processor, and instructions stored in the memory. The instructions may be executable by the processor to cause the apparatus to receive, from a second UE, a first portion of a synchronization signal, receive, from the second UE, a second portion of the synchronization signal, perform one or more operations to determine a cyclic shift applied to the second portion of the synchronization signal, where the second portion of the synchronization signal is shifted relative to the first portion of the synchronization signal, and transmit communications to the second UE based on receiving the first and second portions of the synchronization signal.

Another apparatus for wireless communication at a first UE is described. The apparatus may include means for receiving, from a second UE, a first portion of a synchronization signal, means for receiving, from the second UE, a second portion of the synchronization signal, means for performing one or more operations to determine a cyclic shift applied to the second portion of the synchronization signal, where the second portion of the synchronization signal is shifted relative to the first portion of the synchronization signal, and means for transmitting communications to the second UE based on receiving the first and second portions of the synchronization signal.

A non-transitory computer-readable medium storing code for wireless communication at a first UE is described. The code may include instructions executable by a processor to receive, from a second UE, a first portion of a synchronization signal, receive, from the second UE, a second portion of the synchronization signal, perform one or more operations to determine a cyclic shift applied to the second portion of the synchronization signal, where the second portion of the synchronization signal is shifted relative to the first portion of the synchronization signal, and transmit communications to the second UE based on receiving the first and second portions of the synchronization signal.

In some examples of the method, apparatuses, and non-transitory computer-readable medium described herein, performing the one or more operations may include operations, features, means, or instructions for performing one or more autocorrelation operations to determine the cyclic shift.

Some examples of the method, apparatuses, and non-transitory computer-readable medium described herein may further include operations, features, means, or instructions for generating one or more hypotheses for the cyclic shift, where the one or more operations to determine the cyclic shift may be based on respective correlations of the one or more hypotheses with the received synchronization signal.

In some examples of the method, apparatuses, and non-transitory computer-readable medium described herein, the cyclic shift may be applied to the first portion of the synchronization signal and the second portion of the synchronization signal.

In some examples of the method, apparatuses, and non-transitory computer-readable medium described herein, the cyclic shift may be applied to the synchronization signal for one of the first portion or the second portion and applying the cyclic shift shifts the synchronization signal for the one of the first portion or the second portion relative to the other of the first portion or the second portion.

A method for wireless communication at a first UE is described. The method may include receiving, from a second UE, a synchronization signal, the synchronization signal including at least a first primary synchronization signal symbol and a second primary synchronization signal symbol, performing one or more operations to determine a cyclic shift applied to the first primary synchronization signal symbol, the second primary synchronization signal symbol, or both, in the time-domain, and transmitting communications to the second UE based on receiving the synchronization signal.

An apparatus for wireless communication at a first UE is described. The apparatus may include a processor, memory coupled with the processor, and instructions stored in the memory. The instructions may be executable by the processor to cause the apparatus to receive, from a second UE, a synchronization signal, the synchronization signal including at least a first primary synchronization signal symbol and a second primary synchronization signal symbol, perform one or more operations to determine a cyclic shift applied to the first primary synchronization signal symbol, the second primary synchronization signal symbol, or both, in the time-domain, and transmit communications to the second UE based on receiving the synchronization signal.

Another apparatus for wireless communication at a first UE is described. The apparatus may include means for receiving, from a second UE, a synchronization signal, the synchronization signal including at least a first primary synchronization signal symbol and a second primary synchronization signal symbol, means for performing one or more operations to determine a cyclic shift applied to the first primary synchronization signal symbol, the second primary synchronization signal symbol, or both, in the time-domain, and means for transmitting communications to the second UE based on receiving the synchronization signal.

A non-transitory computer-readable medium storing code for wireless communication at a first UE is described. The code may include instructions executable by a processor to receive, from a second UE, a synchronization signal, the synchronization signal including at least a first primary synchronization signal symbol and a second primary synchronization signal symbol, perform one or more operations to determine a cyclic shift applied to the first primary synchronization signal symbol, the second primary synchronization signal symbol, or both, in the time-domain, and transmit communications to the second UE based on receiving the synchronization signal.

Some examples of the method, apparatuses, and non-transitory computer-readable medium described herein may further include operations, features, means, or instructions for performing one or more autocorrelation operations to determine the cyclic shift.

Some examples of the method, apparatuses, and non-transitory computer-readable medium described herein may further include operations, features, means, or instructions for generating one or more hypotheses for the cyclic shift, where the one or more operations to determine the cyclic shift may be based on respective correlations of the one or more hypotheses with the received synchronization signal.

In some examples of the method, apparatuses, and non-transitory computer-readable medium described herein, the cyclic shift may be applied to the first primary synchronization signal symbol and the second primary synchronization signal symbol of the synchronization signal.

In some examples of the method, apparatuses, and non-transitory computer-readable medium described herein, the cyclic shift may be applied to the synchronization signal for one of the first primary synchronization signal symbol or the second primary synchronization signal symbol and the cyclic shift shifts the synchronization signal for the one of the first primary synchronization signal symbol or the second primary synchronization signal symbol relative to the other of the first primary synchronization signal symbol or the second primary synchronization signal symbol.

DETAILED DESCRIPTION

Figure 1:
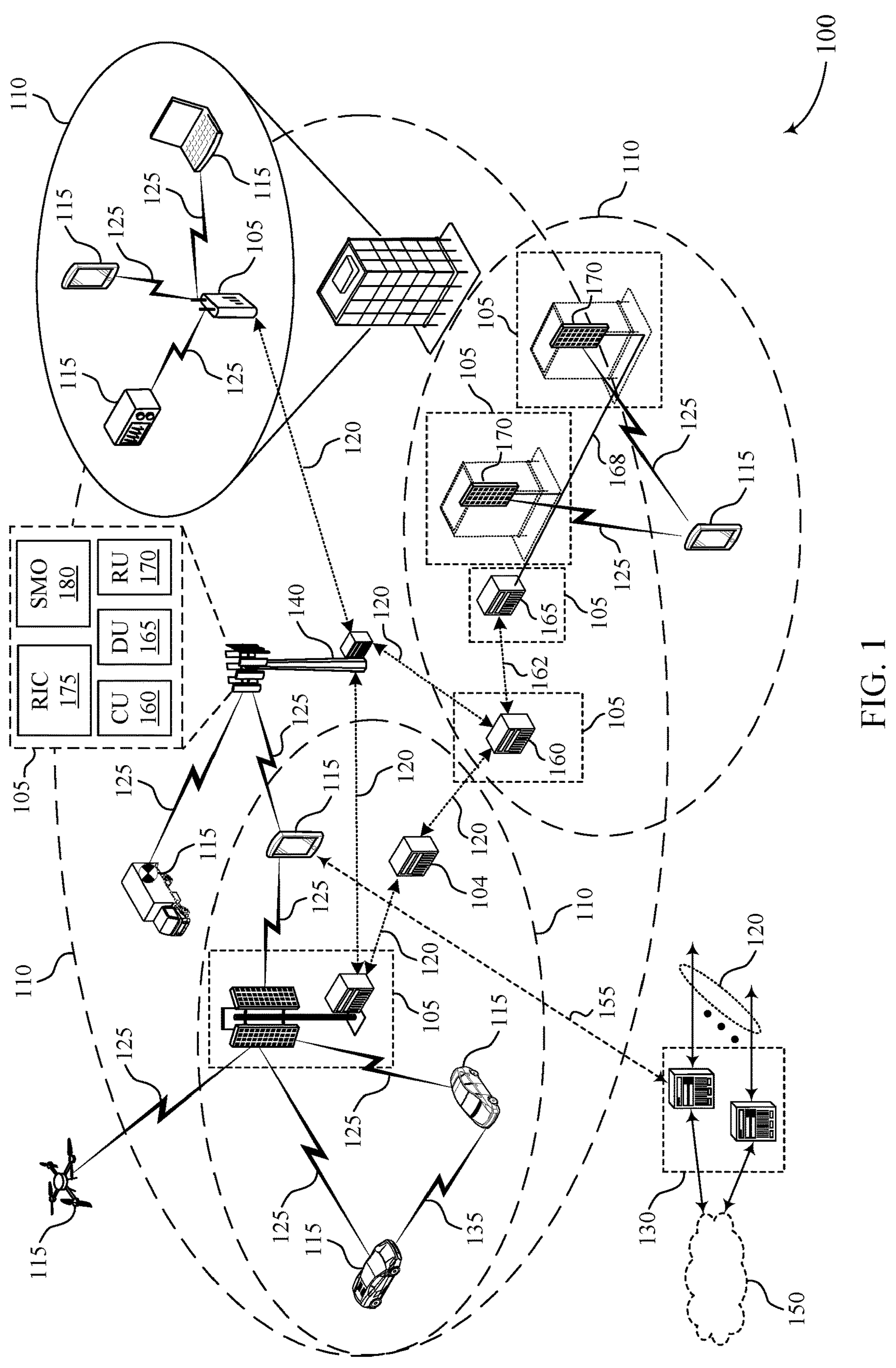
FIG. 1 shows an example of a wireless communications system that supports methods for communicating synchronization signals using cyclic shifts in accordance with one or more aspects of the present disclosure.

Some wireless communication devices may transmit and receive synchronization signaling via sidelink communications. For example, a user equipment (UE) in a network supporting sidelink communication between UEs may periodically transmit one or more sidelink synchronization signals (SLSSs), which may enable other UEs to synchronize communications with the UE. For example, the network may support cellular vehicle-to-everything (CV2X) signaling used to implement vehicle safety features or for autonomous vehicle operation. CV2X signaling may include radio signals used to share safety information, such as velocity, direction, acceleration, or other information, among vehicles and with roadside infrastructure, such a roadside units (RSUs). CV2X may function to share sensor data between vehicles. If multiple UEs and/or RSUs transmit SLSSs (e.g., using a same modulation scheme), the multiple SLSSs may interfere destructively, which may prevent other UEs from receiving or otherwise decoding the multiple SLSSs. In some other cases, the multiple SLSSs may follow different propagation paths and accordingly may be received by a UE at different times, which may cause the UE to incorrectly interpret (e.g., determine) that the multiple SLSSs were transmitted by a single UE using transmit diversity (e.g., delay diversity).

A UE may select a cyclic shift for transmitting SLSSs, which may differentiate SLSSs transmitted by different UEs (e.g., UEs may select different cyclic shifts) and/or reduce destructive interference that may otherwise occur between SLSSs. In some cases, a UE may apply a cyclic shift in the time domain to one or more symbols of an SLSS, such as one or more primary sidelink synchronization signal (PSSS) symbols of an SLSS. For example, a UE may apply a cyclic shift to a single PSSS symbol of an SLSS (e.g., and refrain from applying the cyclic shift to a second PSSS symbol of the SLSS) or the UE may apply a cyclic shift (e.g., a same cyclic shift) to both PSSS symbols of the SLSS. A receiving UE may utilize one or more cyclic shift hypotheses for receiving and decoding SLSSs. For example, a receiving UE may apply one or more cyclic shift hypothesis (e.g., assumptions) to incoming SLSSs and perform one or more operations to evaluate an accuracy of each hypothesis. In some cases, a receiving UE may perform an autocorrelation operation to receive SLSSs (e.g., to detect the cyclic shift) or otherwise evaluate the accuracy for various cyclic shift hypothesis. In such cases, a UE may determine if SLSSs are transmitted by a single UE (e.g., with or without transmit diversity) or multiple UEs, which may improve communication reliability for SLSSs.

Aspects of the disclosure are initially described in the context of wireless communications systems. Aspects of the disclosure are further illustrated by and described with reference to synchronization signal slot formats, process flows, apparatus diagrams, system diagrams, and flowcharts that relate to methods for communicating synchronization signals using cyclic shifts.

FIG. 1 shows an example of a wireless communications system 100 that supports methods for communicating synchronization signals using cyclic shifts in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support methods for communicating synchronization signals using cyclic shifts as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as RSUs, or with the network via one or more network nodes (e.g., network entities 105, base stations 140, RUs 170) using vehicle-to-network (V2N) communications, or with both. V2X communications may include CV2X communications, which may include radio signals used to share safety information, such as velocity, direction, acceleration, or other information, among vehicles and with roadside infrastructure, such as RSUs.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, where the wireless communications system 100 supports sidelink communications between UEs 115, UEs 115 may periodically transmit one or more SLSSs, which may enable other UEs 115 to synchronize communications with the UE 115. Some UEs 115 may be vehicles be equipped with on-board transceivers to enable wireless communications with other vehicles or devices (e.g., UEs 115). Such wireless communications may include, for example, communication of CV2X signals. CV2X signals may be used to implement vehicle safety features or for autonomous vehicle operation. For example, CV2X signals may include radio signals used to share safety information, such as velocity, direction, acceleration, or other information, among vehicles and with roadside infrastructure, such a RSUs. If multiple UEs 115 and/or RSUs transmit SLSSs (e.g., using a same modulation scheme), the multiple SLSSs may interfere destructively, which may prevent other UEs 115 from receiving or otherwise decoding the multiple SLSSs. In some other cases, the multiple SLSSs may follow different propagation paths and accordingly may be received by a UE 115 at different times, which may cause the UE 115 to incorrectly interpret (e.g., determine) that the multiple SLSSs were transmitted by a single UE 115 using transmit diversity (e.g., delay diversity).

A UE 115 may select a time-domain cyclic shift for transmitting SLSSs, which may differentiate SLSSs transmitted by different UEs 115 (e.g., UEs 115 may select different cyclic shifts) and reduce destructive interference that may otherwise occur between SLSSs. In some cases, a UE 115 may apply a cyclic shift in the time domain to one or more symbols of an SLSS, such as one or more PSSS symbols of an SLSS. For example, a UE 115 may apply a cyclic shift to a single PSSS symbol of an SLSS (e.g., and refrain from applying the cyclic shift to a second PSSS symbol of the SLSS) or the UE 115 may apply a cyclic shift (e.g., a same cyclic shift) to both PSSS symbols of the SLSS. A receiving UE 115 may utilize one or more cyclic shift hypotheses for receiving and decoding SLSSs. For example, a receiving UE 115 may apply one or more cyclic shift hypothesis (e.g., assumptions) to incoming SLSSs and perform one or more operations to evaluate an accuracy of each hypothesis. In some cases, a receiving UE 115 may perform an autocorrelation operation to receive SLSSs (e.g., to detect the cyclic shift) or otherwise evaluate the accuracy for various cyclic shift hypothesis. In such cases, a UE 115 may determine if SLSSs are transmitted by a single UE 115 (e.g., with or without transmit diversity) or multiple UEs 115, which may improve communication reliability for SLSSs.

Figure 2:
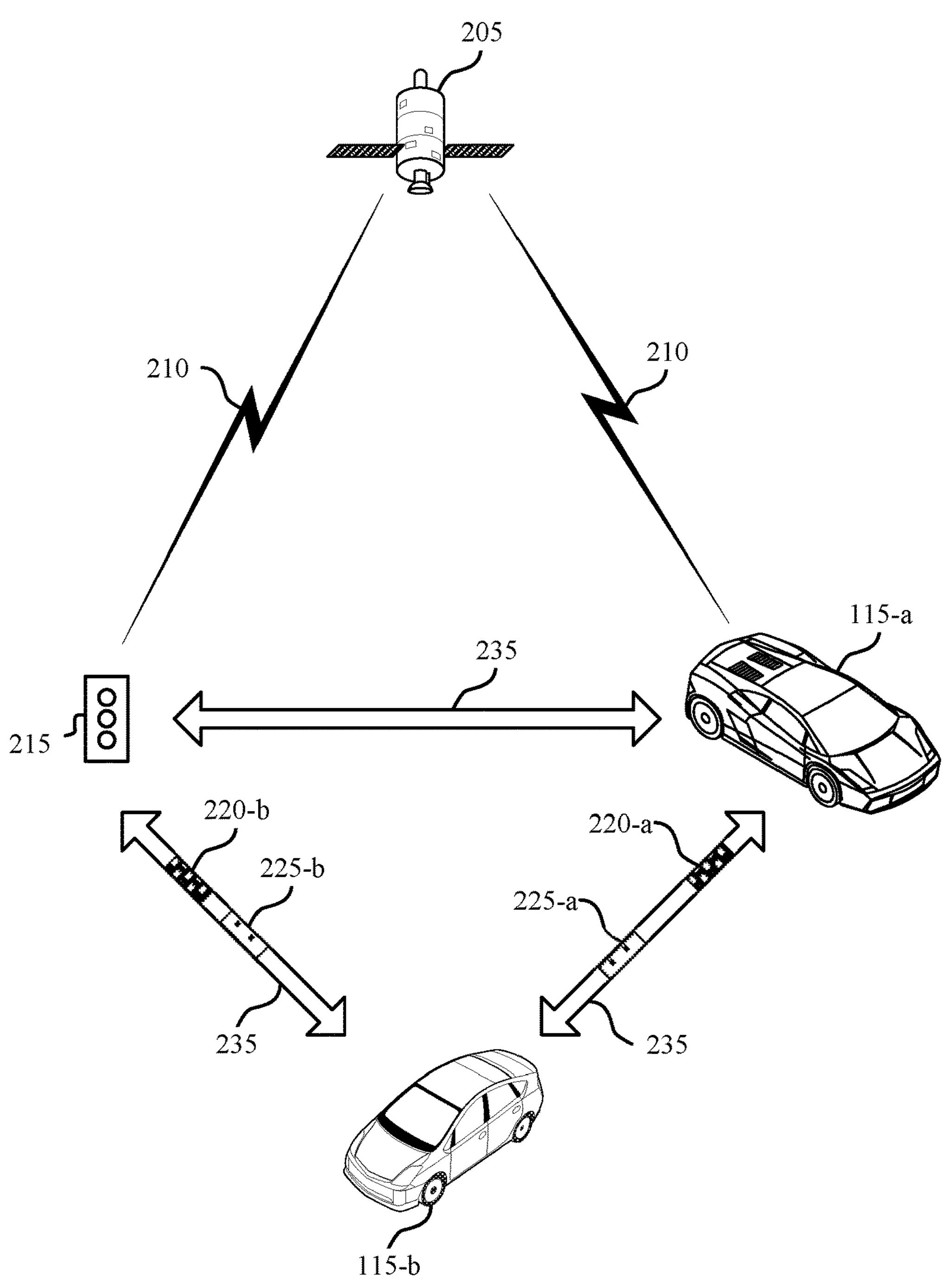
FIG. 2 shows an example of a wireless communications system that supports methods for communicating synchronization signals using cyclic shifts in accordance with one or more aspects of the present disclosure.

FIG. 2 shows an example of a wireless communications system 200 that supports methods for communicating synchronization signals using cyclic shifts in accordance with one or more aspects of the present disclosure. In some examples, wireless communications system 200 may implement aspects of wireless communications system 100.

The wireless communications system 200 may include a UE 115-*a* and a UE 115-*b*, which may be examples of UEs 115 as described herein. For example, the UE 115-*a* and the UE 115-*b* may be vehicles equipped with on-board transceivers to enable wireless communications with other vehicles or devices (e.g., UEs 115 or RSUs). For example, the UE 115-*a*, the UE 115-*b*, and an RSU 215 may communicate via CV2X links 235.

In some aspects, CV2X devices, such as the UE 115-*a*, the UE 115-*b*, and the RSU 215 may use global navigation satellite system (GNNS) signals 210 transmitted by GNSS satellite(s) 205 to synchronize communications over the CV2X links. In some cases, however, GNSS may not be available to one or more of the CV2X devices. For example, the UE 115-*b* may be unable to receive GNSS signals 210 due to blockages such as buildings or tunnels.

UEs 115 and RSUs 215 may therefore periodically transmit SLSSs 220 to synchronize communications over the CV2X links 235 at the receiver. A PSSS may be the primary signal used for synchronization and detection of the SLSSs 220. Synchronization via an SLSS 220 may be used for successful decoding of a physical sidelink broadcast channel (PSBCH), which may contain information to improve synchronization. After successful synchronization and detection of the SLSS 220 and the PSBCH message, the receiving UE 115 may know or have improved knowledge of the timing (e.g., indices and timings that mark the beginnings of frames, slots, and/or subframes) for CV2X communication with the transmitting UE 115 or RSU 215. An SLSS 220 may include 2 consecutive PSSSs that may be identical. For example, the SLSS 220 may include 2 consecutive identical PSSSs as a backup (e.g., for redundancy) in case the first PSSS is not detected. SLSSs 220 may be transmitted in predefined slots. In some examples, an SLSS 220 may indicate whether the transmitting device is synchronized via GNSS signals 210 or via another SLSS 220. Different SLSSs 220 may have different priorities based on whether the transmitting device is connected to GNSS, is synchronized with a device that is connected to GNSS, or is not synchronized via GNSS.

More than one RSU 215 or UE 115 may transmit SLSSs 220 at the same time. For example, the UE 115-*a* may transmit an SLSS 220-*a* that at least partially overlaps in time with an SLSS 220-*b* transmitted by the RSU 215. There may be two options for PSSS signal types (e.g., two different predefined Zadoff-Chu sequences in LTE or two different predefined m-sequences in NR), so PSSSs in time-overlapping SLSSs 220 transmitted by different UEs 115 and/or RSUs 215 may collide, especially in heavy traffic scenarios. Additionally, or alternatively, the multiples SLSS 220 (e.g., the SLSS 220-*a* transmitted by the UE 115-*a* and the SLSS 220-*b* transmitted by the RSU 215) may follow different propagation paths, and accordingly may be received by a UE at different times, which may cause the UE to incorrectly interpret (e.g., determine) that the multiple SLSSs were transmitted by a single UE using transmit diversity (e.g., delay diversity). For example, receiving two transmissions with the same cyclic shift or without a cyclic shift may result in destructive combining at the receiving UE 115-*b* and/or may appear at the receiving UE 115-*b* similar to one transmitting device transmitting a single SLSS 220 using delay diversity. Use of a cyclic shift in the time domain may improve detectability and decoding of time-overlapping SLSSs from multiple different sources.

A device that transmits a SLSS 220 may add a cyclic shift in the time domain to a portion of the SLSS. As described herein, an SLSS may include two PSSS symbols. In some examples, the device that transmits an SLSS 220 may add a cyclic shift in the time domain to both of the PSSS symbols. For example, the UE 115-*a* may add a cyclic shift in the time domain to the PSSS symbols of the SLSS 220-*a* and the RSU 215 may add a cyclic shift in the time domain to the PSSS symbols of the SLSS 220-*b*. As another example, a device that transmits an SLSS 220 may add a cyclic shift in the time domain to a single PSSS symbol of the SLSS 220 and refrain from adding the cyclic shift in the time domain to the other PSSS symbol of the SLSS 220. For example, the UE 115-*a* may add a cyclic shift in the time domain to the second PSSS symbol of the SLSS 220-*a* (and the first PSSS symbol does not include a cyclic shift in the time domain) and the RSU 215 may add a cyclic shift in the time domain to the second PSSS symbol of the SLSS 220-*b* (and the first PSSS symbol does not include a cyclic shift in the time domain). Adding a cyclic shift in the time domain to the second PSSS symbol and refraining from adding a cyclic shift in the time domain to the first PSSS symbol may decrease algorithm complexity (e.g., for a receiver) as compared to adding a cyclic shift to both PSSS symbols.

In some examples, the cyclic shift may be generated in accordance with a function, where inputs to the function may include one or more of an identifier for the UE 115-*a* or RSU 215 (e.g., a radio network temporary identifier (RNTI)), or identifier derived from previous communications by the UE 115-*a* or RSU 215 (such as bits of a physical sidelink control channel (PSCCH)). In some examples, the cyclic shift may be randomly (e.g., pseudo-randomly) generated. For example, the output of the function that generates the cyclic shift may be pseudo-random. A pseudo-randomly generated cyclic shift may improve collision avoidance due to the random cyclic shift in the time domain in the one or both PSSSs. The function may be based on inputs other than the SLSS-ID (e.g., the network identifier (NID)) of the SLSS, such that the receiving UE 115-*b* may distinguish time-overlapping SLSSs having the same SLSS-ID or NID that were transmitted by different devices (e.g., the UE 115-*a* and the RSU 215). In some aspects, a priority may indicate the NID. In some aspects, more than one priority may be associated with the same NID, which may change the PSBCH message but not the SLSS signal. Accordingly, absent application of a cyclic shift to the PSSS, a receiving UE may not be able to distinguish time-overlapping SLSSs having the same NID.

The receiving UE 115-*b* may utilize one or more cyclic shift hypotheses for receiving and decoding the SLSSs 220. For example, the receiving UE 115-*b* may apply one or more cyclic shift hypothesis (e.g., assumptions) to the incoming SLSS 220-*a* and the incoming SLSS 220-*b* and may perform one or more operations to evaluate an accuracy of each hypothesis. In some cases, the receiving UE 115-*b* may perform an autocorrelation operation to receive the SLSSs 220 (e.g., to detect the cyclic shift in the time domain) or otherwise evaluate the accuracy for various cyclic shift hypothesis. For example, when the cyclic shift is applied to both PSSS symbols in the time domain, the receiving UE 115-*b* may determine whether the PSSS symbols are correlated and may be agnostic to the cyclic shift. In comparison, if a cyclic shift is applied in the frequency domain, the frequency shift would negatively affect the autocorrelation procedure applied by the receiving UE 115-*b* as the signal in the frequency-shifted symbol would not be a time-shifted version of itself (e.g., the signal in the symbol that was not frequency-shifted).

As another example, the receiving UE 115-*a* may be aware of several options for cyclic shifts, and may use the knowledge of those options as the hypotheses for the cyclic shift. The receiving UE 115-*b* may determine if the SLSSs 220 are transmitted by a single UE 115 (e.g., with or without transmit diversity) or multiple UEs 115 and/or RSUs 215. For example, based on detecting the cyclic shift applied to the PSSS(s) of the SLSS 220-*a* and the cyclic shift applied to the PSSS(s) of the SLSS 220-*b*, the UE 115-*b* may determine that the SLSS 220-*a* was transmitted by the UE 115-*a* and that the SLSS 220-*b* was transmitted by the RSU 215. Based on the SLSS 220-*a*, the UE 115-*b* may synchronize timing for one or more communications 225-*a* with the UE 115-*a*. Similarly, on the SLSS 220-*b*, the UE 115-*b* may synchronize timing for one or more communications 225-*b* with the RSU 215.

Figure 3:
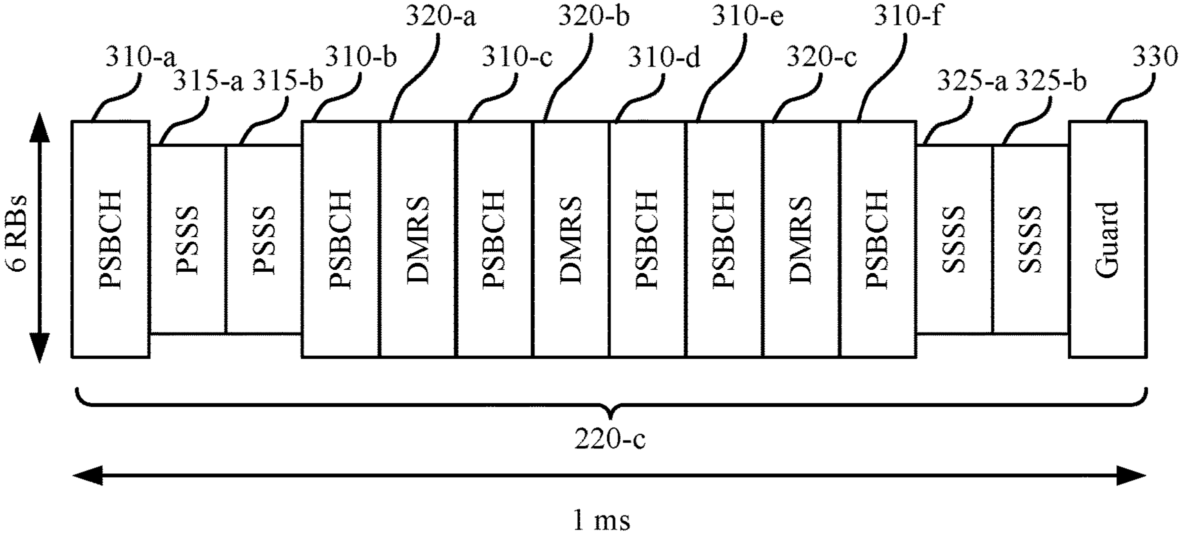
FIG. 3 shows an example of a synchronization signal slot format that supports methods for communicating synchronization signals using cyclic shifts in accordance with one or more aspects of the present disclosure.

FIG. 3 shows an example of a synchronization signal slot format 300 that supports methods for communicating synchronization signals using cyclic shifts in accordance with one or more aspects of the present disclosure. The synchronization signal slot format 300 may implement or may be implemented by aspects of the wireless communications system 100 or the wireless communications system 200. For example, the synchronization signal slot format 300 shows an example format of an SLSS 220-*c* that may be transmitted by a UE 115 or an RSU 215, as described herein.

As shown, the SLSS 220-*c* may include a first PSBCH symbol 310-*a*, a first PSSS symbol 315-*a*, a second PSSS symbol 315-*b*, a second PSBCH symbol 310-*b*, a first demodulation reference signal (DMRS) symbol 320-*a*, a third PSBCH symbol 310-*c*, a second DMRS symbol 320-*b*, a fourth PSBCH symbol 310-*d*, a fifth PSBCH symbol 310-*e*, a third DMRS symbol 320-*c*, a sixth PSBCH symbol 310-*f*, a first secondary sidelink synchronization signal (SSSS) symbol 325-*a*, a second SSSS symbol 325-*b*, and a guard symbol 330. The NID of the SLSS 220-*c* may determine the scrambling of the PSBCH symbols 310-*b* and the DMRS sequences.

In some examples, as described herein, a UE 115 that transmits an SLSS 220-*c* may apply a cyclic shift in the time domain to the first PSSS symbol 315-*a* and to the second PSSS symbol 315-*b* so that a receiving UE 115 may identify the SLSS 220-*c* as being transmitted by the UE 115. In some examples, a UE 115 that transmits an SLSS 220-*c* may apply a cyclic shift in the time domain to the second PSSS symbol 315-*b* and not to the first PSSS symbol 315-*a* so that a receiving UE 115 may identify the SLSS 220-*c* as being transmitted by the UE 115. Adding a cyclic shift in the time domain to the second PSSS symbol 315-*b* and refraining from adding a cyclic shift in the time domain to the first PSSS symbol 315-*a* may decrease algorithm complexity as compared to adding a cyclic shift in the time domain to both the first PSSS symbol 315-*a* and the second PSSS symbol 315-*b*. In some examples, the cyclic shift in the time domain may be applied to the first PSSS symbol 315-*a* and no to the second PSSS symbol 315-*b*. Applying the cyclic shift in the time domain to one of the PSSS symbols 315 and not the other shifts the synchronization signal transmitted in the one PSSS symbol 315 relative to the synchronization signal transmitted in the other PSSS symbol 315.

In cases where the cyclic shift in the time domain is applied to the second PSSS symbol 315-*b* and not to the first PSSS symbol 315-*a*, the cyclic shift in the time domain in the second PSSS symbol 315-*b* may be used to detect if more than one SLSSs 220 are being received from multiple UEs. The receiving UE 115 may receive the first PSSS symbol 315-*a* and then receive and perform the cyclic shift hypotheses procedure for the second PSSS symbol 315-*b*. The receiving UE 115 may then correlate the first PSSS symbol 315-*a* with the second PSSS symbol to identify from which transmitting device the first PSSS symbol was received, as well as the remaining symbols of the SLSS 220.

Figure 4:
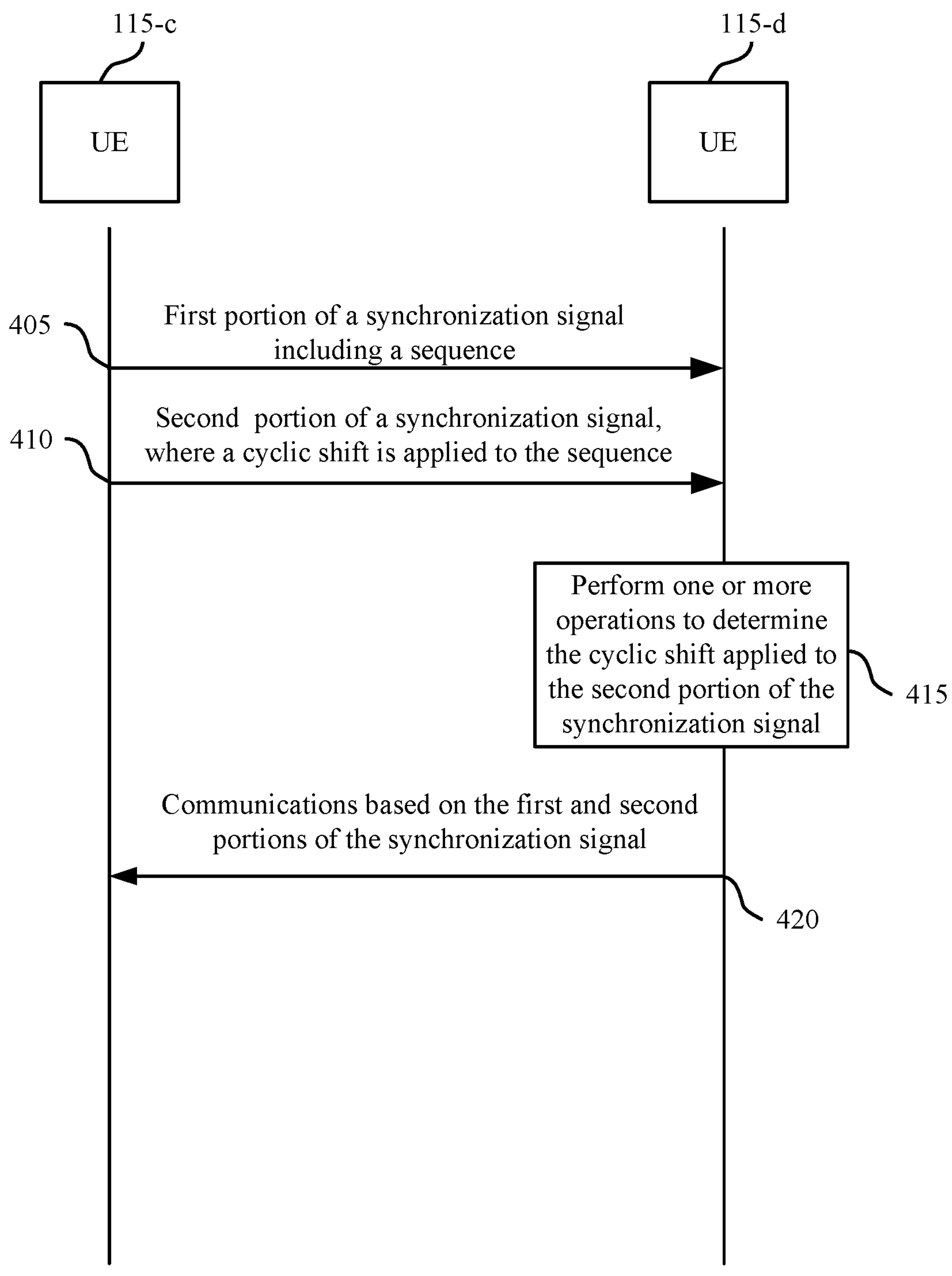
FIG. 4 shows an example of a process flow that supports methods for communicating synchronization signals using cyclic shifts in accordance with one or more aspects of the present disclosure.

FIG. 4 shows an example of a process flow 400 that supports methods for communicating synchronization signals using cyclic shifts in accordance with one or more aspects of the present disclosure. The process flow may include a first UE 115-*c* and a second UE 115-*d*, which may be an example of UEs 115 as described herein. In the following description of the process flow 400, the operations between the first UE 115-*c* and the second UE 115-*d* may be transmitted in a different order than the example order shown, or the operations performed by the first UE 115-*c* and the second UE 115-*d* may be performed in different orders or at different times. Some operations may also be omitted from the process flow 400, and other operations may be added to the process flow 400.

At 405, the first UE 115-*c* may transmit, and the second UE 115-*d* may receive, a first portion (e.g., the first PSSS symbol) of a synchronization signal (e.g., an SLSS), where the first portion of the synchronization signal includes a sequence (e.g., a Zadoff-Chu sequence in LTE or an m-sequence in NR).

At 410, the first UE 115-*c* may transmit, and the second UE 115-*d* may receive, a second portion (e.g., the second PSSS symbol) of the synchronization signal including the sequence, where a cyclic shift is applied to the sequence for the second portion of the synchronization signal that shifts the second portion of the synchronization signal relative to the first portion of the synchronization signal.

In some examples, the first UE 115-*c* may generate the cyclic shift using a function, where an output of the function includes the cyclic shift. In some examples, one or more bits associated with communications previously transmitted by the first UE 115-*c*, an identifier for the first UE 115-*c*, or both, are inputs for the function. In some examples, the output of the function includes a pseudo-random output. In some examples, the first UE 115-*c* may generate the cyclic shift based on one or more bits of a PSCCH communication previously transmitted by the first UE 115-*c*, an identifier for the first UE 115-*c*, or both.

In some examples, the first UE 115-*c* may transmit the first portion of the synchronization signal without applying cyclic shift to the sequence during the first portion of the synchronization signal.

At 415, the second UE 115-*d* may perform one or more operations to determine a cyclic shift applied to the second portion of the synchronization signal.

In some examples, the one or more operations may include one or more autocorrelation operations to determine the cyclic shift. In some examples, the second UE 115-*d* may generate one or more hypotheses for the cyclic shift, where the one or more operations to determine the cyclic shift are based on respective correlations of the one or more hypotheses with the received synchronization signal.

At 420, the second UE 115-*d* may transmit, to the first UE 115-*c*, communications based on receiving the first and second portions of the synchronization signal.

Figure 5:
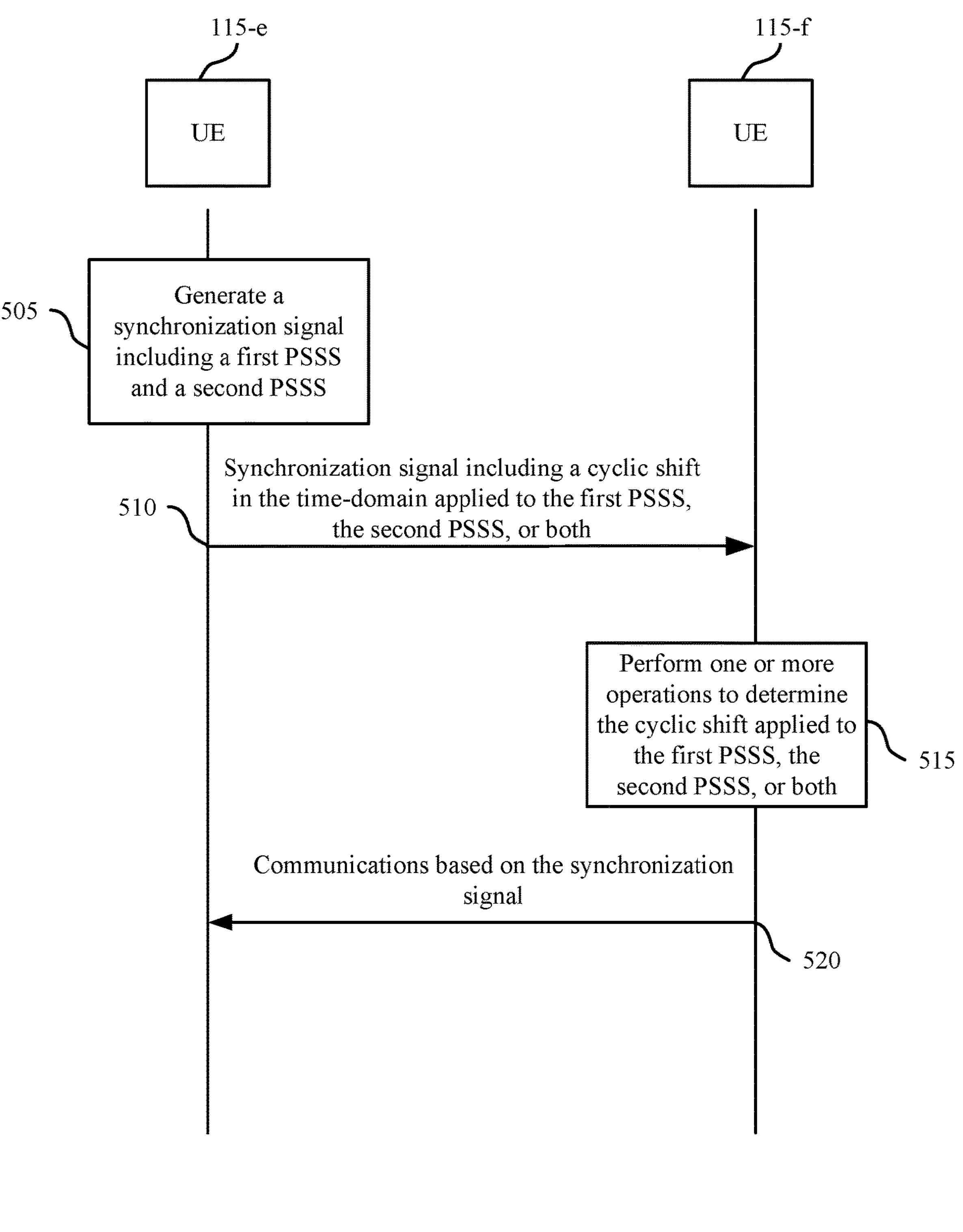
FIG. 5 shows an example of a process flow that supports methods for communicating synchronization signals using cyclic shifts in accordance with one or more aspects of the present disclosure.

FIG. 5 shows an example of a process flow 500 that supports methods for communicating synchronization signals using cyclic shifts in accordance with one or more aspects of the present disclosure. The process flow may include a first UE 115-*e* and a second UE 115-*f*, which may be an example of UEs 115 as described herein. In the following description of the process flow 500, the operations between the first UE 115-*e* and the second UE 115-*f* may be transmitted in a different order than the example order shown, or the operations performed by the first UE 115-*e* and the second UE 115-*f* may be performed in different orders or at different times. Some operations may also be omitted from the process flow 500, and other operations may be added to the process flow 500.

At 505, the first UE 115-*e* may generate a synchronization signal (e.g., an SLSS) for transmission based on a sequence, the synchronization signal including a first primary synchronization signal (e.g., a first PSSS) and a second primary synchronization signal (e.g., a second PSSS).

At 510, the first UE 115-*e* may transmit, and the second UE 115-*f* may receive, the synchronization signal, where transmitting the synchronization signal includes applying a cyclic shift in the time-domain to the first primary synchronization signal, the second primary synchronization signal, or both.

In some examples, the first UE 115-*e* may apply the cyclic shift to the sequence during the first primary synchronization signal symbol and the second primary synchronization signal symbol. In some examples, the first UE 115-*e* may apply the cyclic shift to the synchronization signal for one of the first primary synchronization signal symbol or the second primary synchronization signal symbol, where applying the cyclic shift shifts the synchronization signal for the one of the first primary synchronization signal symbol or the second primary synchronization signal symbol relative to the other of the first primary synchronization signal symbol or the second primary synchronization signal symbol.

In some examples, the first UE 115-*e* may generate the cyclic shift using a function, where an output of the function includes the cyclic shift. In some examples, one or more bits associated with a sidelink broadcast channel communications or sidelink control channel communications are inputs for the function. In some examples, the output of the function includes a pseudo-random output. In some examples, the first UE 115-*c* may generate the cyclic shift based on one or more bits of a PSCCH communication previously transmitted by the first UE 115-*e*, an identifier for the first UE 115-*e*, or both.

At 515, the second UE 115-*f* may perform one or more operations to determine the cyclic shift applied to the first primary synchronization signal, the second primary synchronization signal, or both, in the time-domain.

In some examples, the second UE 115-*f* may perform one or more autocorrelation operations to determine the cyclic shift. In some examples, the second UE 115-*f* may generate one or more hypotheses for the cyclic shift, where the one or more operations to determine the cyclic shift is based on respective correlations of the one or more hypotheses with the received synchronization signal. In some examples, the cyclic shift is applied to the first primary synchronization signal symbol and the second primary synchronization signal symbol of the synchronization signal.

In some examples, the cyclic shift is applied to the synchronization signal for one of the first primary synchronization signal or the second primary synchronization signal, and the cyclic shift shifts the synchronization signal for the one of the first primary synchronization signal or the second primary synchronization signal relative to the other of the first primary synchronization signal or the second primary synchronization signal.

At 520, the second UE 115-*f* may transmit, to the first UE 115-*e*, communications based on receiving the synchronization signal.

Figure 6:
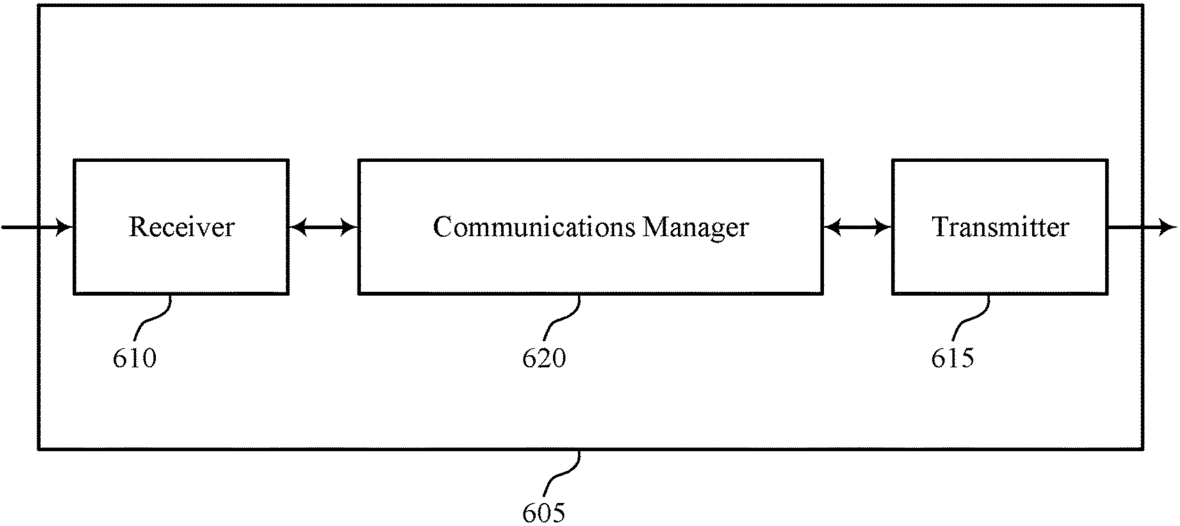
FIGS. 6 and 7 show block diagrams of devices that support methods for communicating synchronization signals using cyclic shifts in accordance with one or more aspects of the present disclosure.

FIG. 6 shows a block diagram 600 of a device 605 that supports methods for communicating synchronization signals using cyclic shifts in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to methods for communicating synchronization signals using cyclic shifts). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to methods for communicating synchronization signals using cyclic shifts). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of methods for communicating synchronization signals using cyclic shifts as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first UE in accordance with examples as disclosed herein. For example, the communications manager 620 is capable of, configured to, or operable to support a means for transmitting a first portion of a synchronization signal, where the first portion of the synchronization signal includes a sequence. The communications manager 620 is capable of, configured to, or operable to support a means for transmitting a second portion of the synchronization signal including the sequence, where a cyclic shift is applied to the sequence for the second portion of the synchronization signal that shifts the second portion of the synchronization signal relative to the first portion of the synchronization signal. The communications manager 620 is capable of, configured to, or operable to support a means for receiving communications from a second UE, the receiving based on transmitting the first and second portions of the synchronization signal.

Additionally, or alternatively, the communications manager 620 may support wireless communication at a first UE in accordance with examples as disclosed herein. For example, the communications manager 620 is capable of, configured to, or operable to support a means for generating a synchronization signal for transmission based on a sequence, the synchronization signal including a first primary synchronization signal symbol and a second primary synchronization signal symbol. The communications manager 620 is capable of, configured to, or operable to support a means for transmitting the synchronization signal, where transmitting the synchronization signal includes applying a cyclic shift in the time-domain to the first primary synchronization signal symbol, the second primary synchronization signal symbol, or both. The communications manager 620 is capable of, configured to, or operable to support a means for receiving communications from a second UE, the receiving based on transmitting the synchronization signal.

Additionally, or alternatively, the communications manager 620 may support wireless communication at a first UE in accordance with examples as disclosed herein. For example, the communications manager 620 is capable of, configured to, or operable to support a means for receiving, from a second UE, a first portion of a synchronization signal. The communications manager 620 is capable of, configured to, or operable to support a means for receiving, from the second UE, a second portion of the synchronization signal. The communications manager 620 is capable of, configured to, or operable to support a means for performing one or more operations to determine a cyclic shift applied to the second portion of the synchronization signal, where the second portion of the synchronization signal is shifted relative to the first portion of the synchronization signal. The communications manager 620 is capable of, configured to, or operable to support a means for transmitting communications to the second UE based on receiving the first and second portions of the synchronization signal.

Additionally, or alternatively, the communications manager 620 may support wireless communication at a first UE in accordance with examples as disclosed herein. For example, the communications manager 620 is capable of, configured to, or operable to support a means for receiving, from a second UE, a synchronization signal, the synchronization signal including at least a first primary synchronization signal symbol and a second primary synchronization signal symbol. The communications manager 620 is capable of, configured to, or operable to support a means for performing one or more operations to determine a cyclic shift applied to the first primary synchronization signal symbol, the second primary synchronization signal symbol, or both, in the time-domain. The communications manager 620 is capable of, configured to, or operable to support a means for transmitting communications to the second UE based on receiving the synchronization signal.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more efficient utilization of communication resources.

Figure 7:
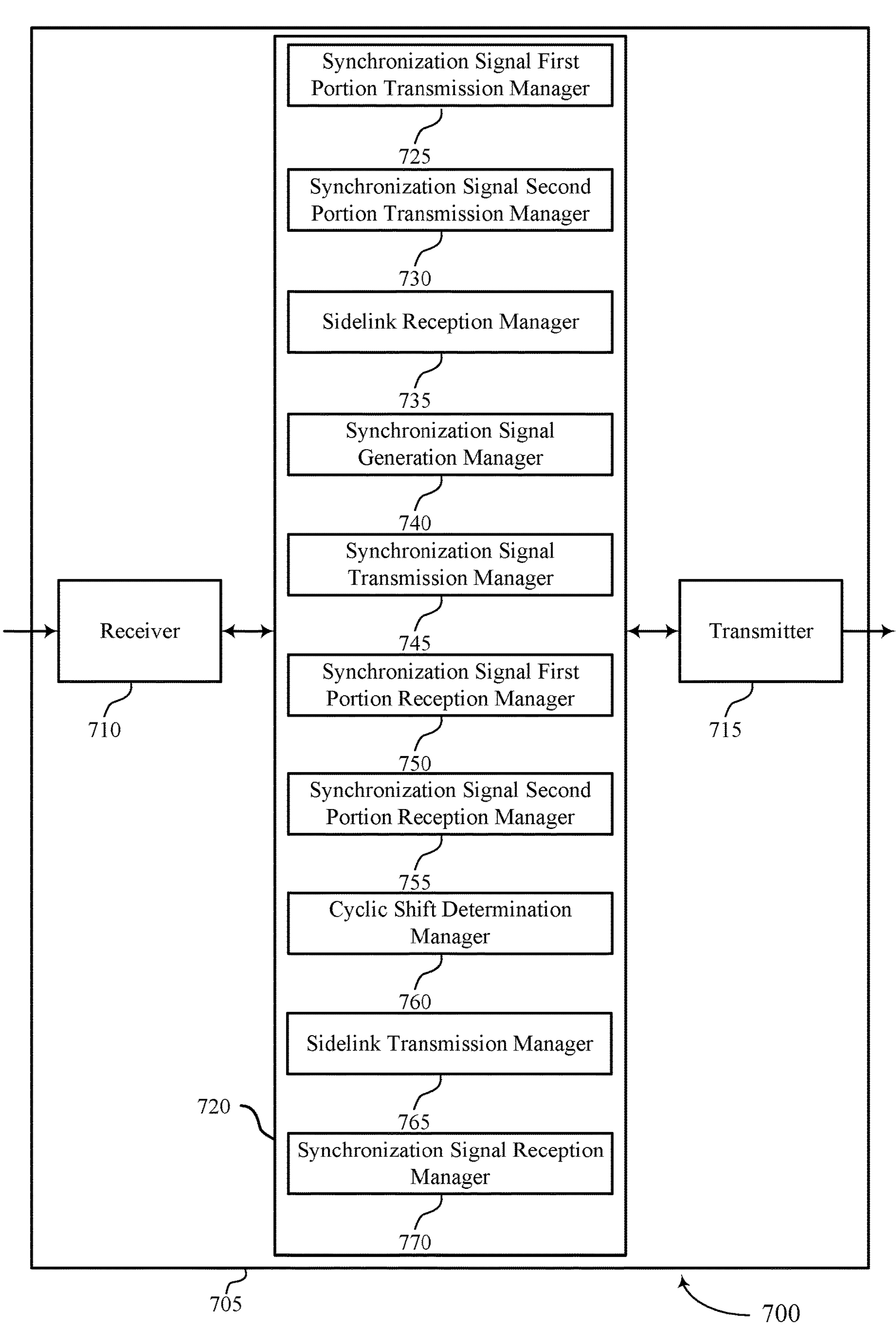

FIG. 7 shows a block diagram 700 of a device 705 that supports methods for communicating synchronization signals using cyclic shifts in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to methods for communicating synchronization signals using cyclic shifts). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to methods for communicating synchronization signals using cyclic shifts). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of methods for communicating synchronization signals using cyclic shifts as described herein. For example, the communications manager 720 may include a synchronization signal first portion transmission manager 725, a synchronization signal second portion transmission manager 730, a sidelink reception manager 735, a synchronization signal generation manager 740, a synchronization signal transmission manager 745, a synchronization signal first portion reception manager 750, a synchronization signal second portion reception manager 755, a cyclic shift determination manager 760, a sidelink transmission manager 765, a synchronization signal reception manager 770, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first UE in accordance with examples as disclosed herein. The synchronization signal first portion transmission manager 725 is capable of, configured to, or operable to support a means for transmitting a first portion of a synchronization signal, where the first portion of the synchronization signal includes a sequence. The synchronization signal second portion transmission manager 730 is capable of, configured to, or operable to support a means for transmitting a second portion of the synchronization signal including the sequence, where a cyclic shift is applied to the sequence for the second portion of the synchronization signal that shifts the second portion of the synchronization signal relative to the first portion of the synchronization signal. The sidelink reception manager 735 is capable of, configured to, or operable to support a means for receiving communications from a second UE, the receiving based on transmitting the first and second portions of the synchronization signal.

Additionally, or alternatively, the communications manager 720 may support wireless communication at a first UE in accordance with examples as disclosed herein. The synchronization signal generation manager 740 is capable of, configured to, or operable to support a means for generating a synchronization signal for transmission based on a sequence, the synchronization signal including a first primary synchronization signal symbol and a second primary synchronization signal symbol. The synchronization signal transmission manager 745 is capable of, configured to, or operable to support a means for transmitting the synchronization signal, where transmitting the synchronization signal includes applying a cyclic shift in the time-domain to the first primary synchronization signal symbol, the second primary synchronization signal symbol, or both. The sidelink reception manager 735 is capable of, configured to, or operable to support a means for receiving communications from a second UE, the receiving based on transmitting the synchronization signal.

Additionally, or alternatively, the communications manager 720 may support wireless communication at a first UE in accordance with examples as disclosed herein. The synchronization signal first portion reception manager 750 is capable of, configured to, or operable to support a means for receiving, from a second UE, a first portion of a synchronization signal. The synchronization signal second portion reception manager 755 is capable of, configured to, or operable to support a means for receiving, from the second UE, a second portion of the synchronization signal. The cyclic shift determination manager 760 is capable of, configured to, or operable to support a means for performing one or more operations to determine a cyclic shift applied to the second portion of the synchronization signal, where the second portion of the synchronization signal is shifted relative to the first portion of the synchronization signal. The sidelink transmission manager 765 is capable of, configured to, or operable to support a means for transmitting communications to the second UE based on receiving the first and second portions of the synchronization signal.

Additionally, or alternatively, the communications manager 720 may support wireless communication at a first UE in accordance with examples as disclosed herein. The synchronization signal reception manager 770 is capable of, configured to, or operable to support a means for receiving, from a second UE, a synchronization signal, the synchronization signal including at least a first primary synchronization signal symbol and a second primary synchronization signal symbol. The cyclic shift determination manager 760 is capable of, configured to, or operable to support a means for performing one or more operations to determine a cyclic shift applied to the first primary synchronization signal symbol, the second primary synchronization signal symbol, or both, in the time-domain. The sidelink transmission manager 765 is capable of, configured to, or operable to support a means for transmitting communications to the second UE based on receiving the synchronization signal.

Figure 8:
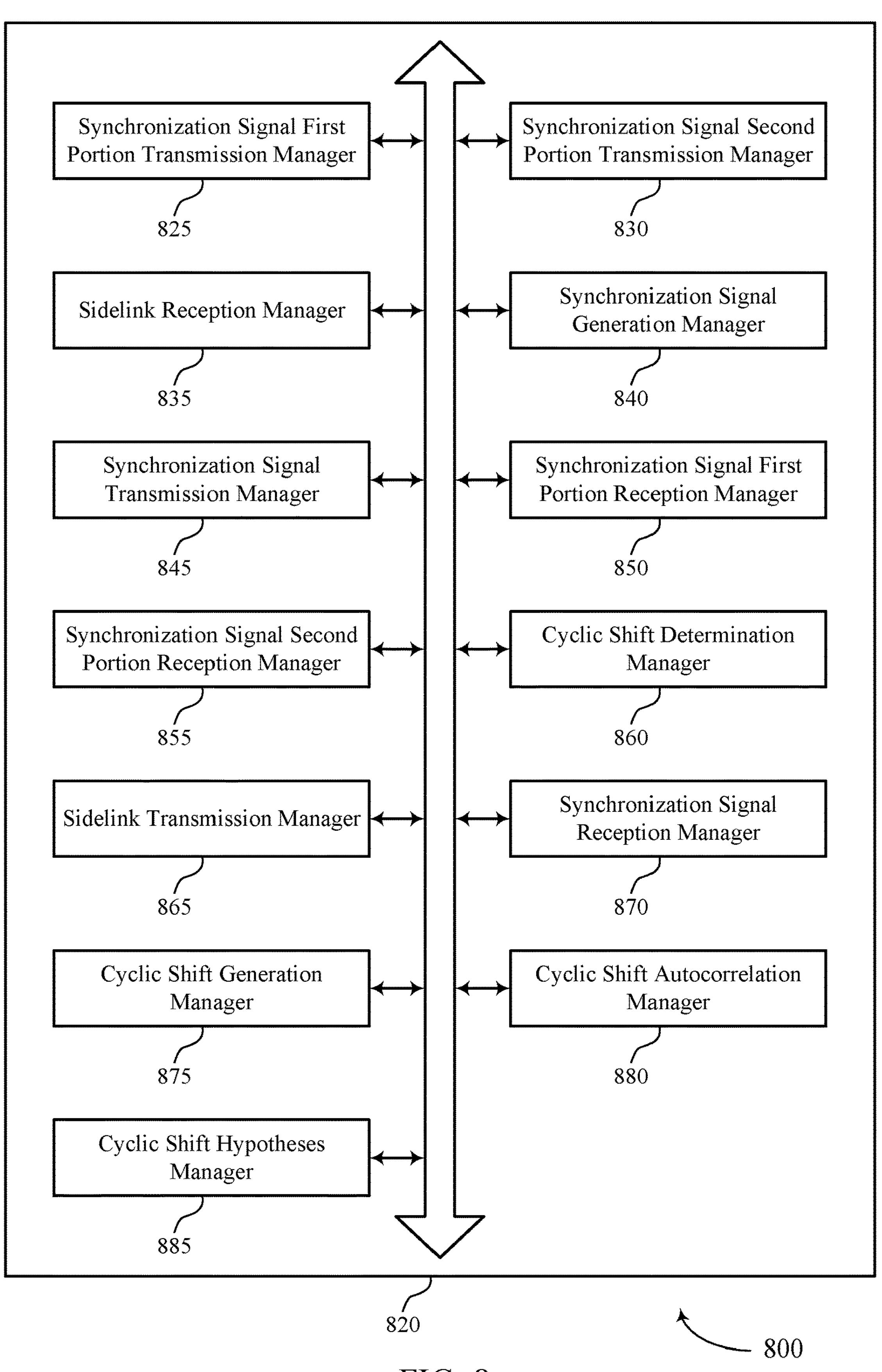
FIG. 8 shows a block diagram of a communications manager that supports methods for communicating synchronization signals using cyclic shifts in accordance with one or more aspects of the present disclosure.

FIG. 8 shows a block diagram 800 of a communications manager 820 that supports methods for communicating synchronization signals using cyclic shifts in accordance with one or more aspects of the present disclosure. The communications manager 820 may be an example of aspects of a communications manager 620, a communications manager 720, or both, as described herein. The communications manager 820, or various components thereof, may be an example of means for performing various aspects of methods for communicating synchronization signals using cyclic shifts as described herein. For example, the communications manager 820 may include a synchronization signal first portion transmission manager 825, a synchronization signal second portion transmission manager 830, a sidelink reception manager 835, a synchronization signal generation manager 840, a synchronization signal transmission manager 845, a synchronization signal first portion reception manager 850, a synchronization signal second portion reception manager 855, a cyclic shift determination manager 860, a sidelink transmission manager 865, a synchronization signal reception manager 870, a cyclic shift generation manager 875, a cyclic shift autocorrelation manager 880, a cyclic shift hypotheses manager 885, or any combination thereof. Each of these components may communicate, directly or indirectly, with one another (e.g., via one or more buses).

The communications manager 820 may support wireless communication at a first UE in accordance with examples as disclosed herein. The synchronization signal first portion transmission manager 825 is capable of, configured to, or operable to support a means for transmitting a first portion of a synchronization signal, where the first portion of the synchronization signal includes a sequence. The synchronization signal second portion transmission manager 830 is capable of, configured to, or operable to support a means for transmitting a second portion of the synchronization signal including the sequence, where a cyclic shift is applied to the sequence for the second portion of the synchronization signal that shifts the second portion of the synchronization signal relative to the first portion of the synchronization signal. The sidelink reception manager 835 is capable of, configured to, or operable to support a means for receiving communications from a second UE, the receiving based on transmitting the first and second portions of the synchronization signal.

In some examples, to support transmitting the first portion of the synchronization signal, the synchronization signal first portion transmission manager 825 is capable of, configured to, or operable to support a means for transmitting the first portion of the synchronization signal without applying the cyclic shift to the sequence during the first portion of the synchronization signal.

In some examples, the cyclic shift generation manager 875 is capable of, configured to, or operable to support a means for generating the cyclic shift using a function, where an output of the function includes the cyclic shift.

In some examples, one or more bits associated with communications previously transmitted by the first UE, an identifier for the first UE, or both, are inputs for the function.

In some examples, the output of the function includes a pseudo-random output.

In some examples, the cyclic shift generation manager 875 is capable of, configured to, or operable to support a means for generating the cyclic shift based on one or more bits of a physical sidelink control channel communication previously transmitted by the first UE, an identifier for the first UE, or both.

Additionally, or alternatively, the communications manager 820 may support wireless communication at a first UE in accordance with examples as disclosed herein. The synchronization signal generation manager 840 is capable of, configured to, or operable to support a means for generating a synchronization signal for transmission based on a sequence, the synchronization signal including a first primary synchronization signal symbol and a second primary synchronization signal symbol. The synchronization signal transmission manager 845 is capable of, configured to, or operable to support a means for transmitting the synchronization signal, where transmitting the synchronization signal includes applying a cyclic shift in the time-domain to the first primary synchronization signal symbol, the second primary synchronization signal symbol, or both. In some examples, the sidelink reception manager 835 is capable of, configured to, or operable to support a means for receiving communications from a second UE, the receiving based on transmitting the synchronization signal.

In some examples, to support transmitting the synchronization signal, the synchronization signal transmission manager 845 is capable of, configured to, or operable to support a means for applying the cyclic shift to the sequence during the first primary synchronization signal symbol and the second primary synchronization signal symbol.

In some examples, to support transmitting the synchronization signal, the synchronization signal transmission manager 845 is capable of, configured to, or operable to support a means for applying the cyclic shift to the synchronization signal for one of the first primary synchronization signal symbol or the second primary synchronization signal symbol, where applying the cyclic shift shifts the synchronization signal for the one of the first primary synchronization signal symbol or the second primary synchronization signal symbol relative to the other of the first primary synchronization signal symbol or the second primary synchronization signal symbol.

In some examples, the cyclic shift generation manager 875 is capable of, configured to, or operable to support a means for generating the cyclic shift using a function, where an output of the function includes the cyclic shift.

In some examples, one or more bits associated with a sidelink broadcast channel communications or sidelink control channel communications are inputs for the function.

In some examples, the output of the function includes a pseudo-random output.

In some examples, the cyclic shift generation manager 875 is capable of, configured to, or operable to support a means for generating the cyclic shift based on one or more bits of a physical sidelink control channel communication previously transmitted by the first UE, an identifier for the first UE, or both.

Additionally, or alternatively, the communications manager 820 may support wireless communication at a first UE in accordance with examples as disclosed herein. The synchronization signal first portion reception manager 850 is capable of, configured to, or operable to support a means for receiving, from a second UE, a first portion of a synchronization signal. The synchronization signal second portion reception manager 855 is capable of, configured to, or operable to support a means for receiving, from the second UE, a second portion of the synchronization signal. The cyclic shift determination manager 860 is capable of, configured to, or operable to support a means for performing one or more operations to determine a cyclic shift applied to the second portion of the synchronization signal, where the second portion of the synchronization signal is shifted relative to the first portion of the synchronization signal. The sidelink transmission manager 865 is capable of, configured to, or operable to support a means for transmitting communications to the second UE based on receiving the first and second portions of the synchronization signal.

In some examples, to support performing the one or more operations, the cyclic shift autocorrelation manager 880 is capable of, configured to, or operable to support a means for performing one or more autocorrelation operations to determine the cyclic shift.

In some examples, the cyclic shift hypotheses manager 885 is capable of, configured to, or operable to support a means for generating one or more hypotheses for the cyclic shift, where the one or more operations to determine the cyclic shift is based on respective correlations of the one or more hypotheses with the received synchronization signal.

In some examples, the cyclic shift is applied to the first portion of the synchronization signal and the second portion of the synchronization signal.

In some examples, the cyclic shift is applied to the synchronization signal for one of the first portion or the second portion. In some examples, applying the cyclic shift shifts the synchronization signal for the one of the first portion or the second portion relative to the other of the first portion or the second portion.

Additionally, or alternatively, the communications manager 820 may support wireless communication at a first UE in accordance with examples as disclosed herein. The synchronization signal reception manager 870 is capable of, configured to, or operable to support a means for receiving, from a second UE, a synchronization signal, the synchronization signal including at least a first primary synchronization signal symbol and a second primary synchronization signal symbol. In some examples, the cyclic shift determination manager 860 is capable of, configured to, or operable to support a means for performing one or more operations to determine a cyclic shift applied to the first primary synchronization signal symbol, the second primary synchronization signal symbol, or both, in the time-domain. In some examples, the sidelink transmission manager 865 is capable of, configured to, or operable to support a means for transmitting communications to the second UE based on receiving the synchronization signal.

In some examples, the cyclic shift autocorrelation manager 880 is capable of, configured to, or operable to support a means for performing one or more autocorrelation operations to determine the cyclic shift.

In some examples, the cyclic shift hypotheses manager 885 is capable of, configured to, or operable to support a means for generating one or more hypotheses for the cyclic shift, where the one or more operations to determine the cyclic shift is based on respective correlations of the one or more hypotheses with the received synchronization signal.

In some examples, the cyclic shift is applied to the first primary synchronization signal symbol and the second primary synchronization signal symbol of the synchronization signal.

In some examples, the cyclic shift is applied to the synchronization signal for one of the first primary synchronization signal symbol or the second primary synchronization signal symbol. In some examples, the cyclic shift shifts the synchronization signal for the one of the first primary synchronization signal symbol or the second primary synchronization signal symbol relative to the other of the first primary synchronization signal symbol or the second primary synchronization signal symbol.

Figure 9:
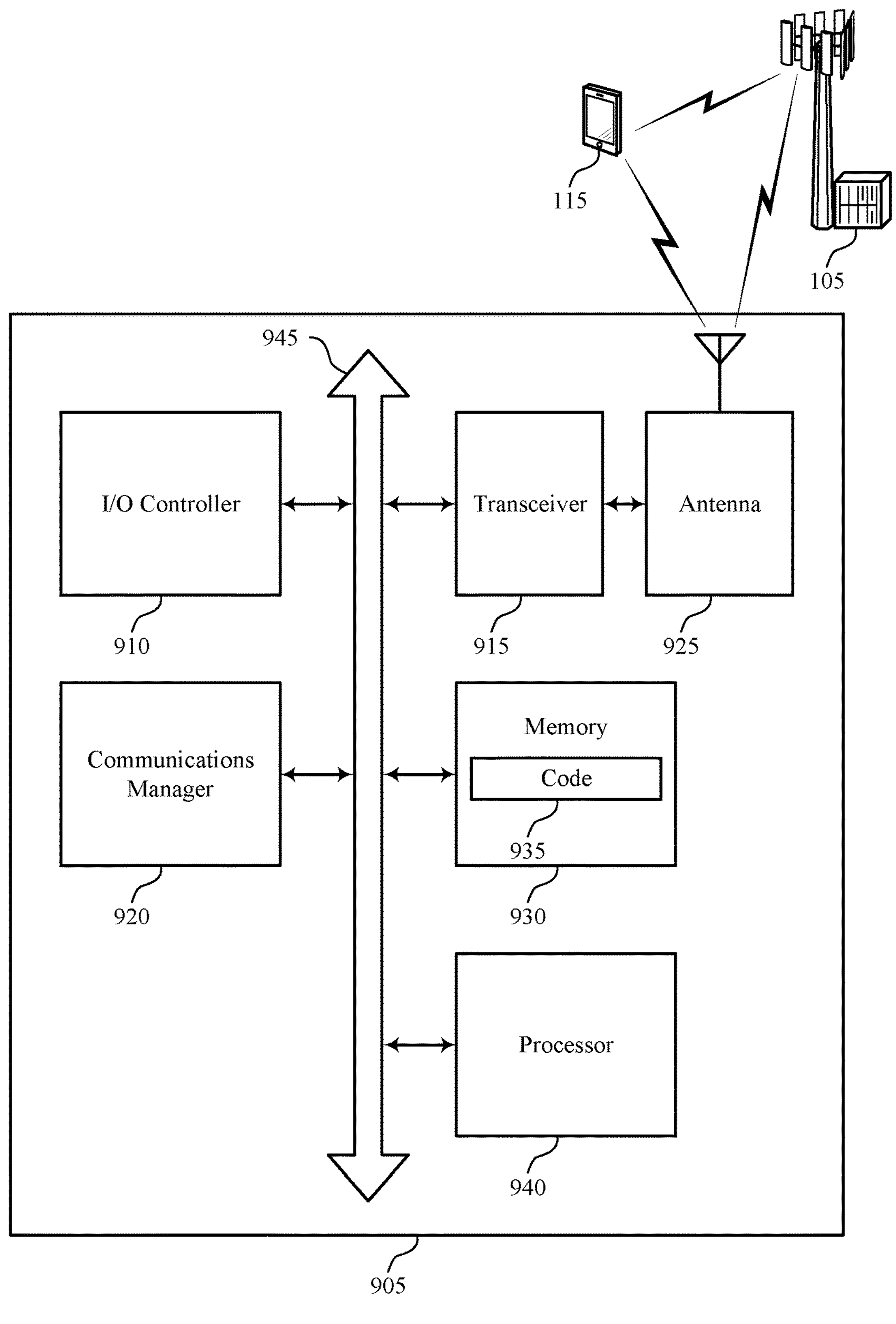
FIG. 9 shows a diagram of a system including a device that supports methods for communicating synchronization signals using cyclic shifts in accordance with one or more aspects of the present disclosure.

FIG. 9 shows a diagram of a system 900 including a device 905 that supports methods for communicating synchronization signals using cyclic shifts in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting methods for communicating synchronization signals using cyclic shifts). For example, the device 905 or a component of the device 905 may include a processor 940 and memory 930 coupled with or to the processor 940, the processor 940 and memory 930 configured to perform various functions described herein.

The communications manager 920 may support wireless communication at a first UE in accordance with examples as disclosed herein. For example, the communications manager 920 is capable of, configured to, or operable to support a means for transmitting a first portion of a synchronization signal, where the first portion of the synchronization signal includes a sequence. The communications manager 920 is capable of, configured to, or operable to support a means for transmitting a second portion of the synchronization signal including the sequence, where a cyclic shift is applied to the sequence for the second portion of the synchronization signal that shifts the second portion of the synchronization signal relative to the first portion of the synchronization signal. The communications manager 920 is capable of, configured to, or operable to support a means for receiving communications from a second UE, the receiving based on transmitting the first and second portions of the synchronization signal.

Additionally, or alternatively, the communications manager 920 may support wireless communication at a first UE in accordance with examples as disclosed herein. For example, the communications manager 920 is capable of, configured to, or operable to support a means for generating a synchronization signal for transmission based on a sequence, the synchronization signal including a first primary synchronization signal symbol and a second primary synchronization signal symbol. The communications manager 920 is capable of, configured to, or operable to support a means for transmitting the synchronization signal, where transmitting the synchronization signal includes applying a cyclic shift in the time-domain to the first primary synchronization signal symbol, the second primary synchronization signal symbol, or both. The communications manager 920 is capable of, configured to, or operable to support a means for receiving communications from a second UE, the receiving based on transmitting the synchronization signal.

Additionally, or alternatively, the communications manager 920 may support wireless communication at a first UE in accordance with examples as disclosed herein. For example, the communications manager 920 is capable of, configured to, or operable to support a means for receiving, from a second UE, a first portion of a synchronization signal. The communications manager 920 is capable of, configured to, or operable to support a means for receiving, from the second UE, a second portion of the synchronization signal. The communications manager 920 is capable of, configured to, or operable to support a means for performing one or more operations to determine a cyclic shift applied to the second portion of the synchronization signal, where the second portion of the synchronization signal is shifted relative to the first portion of the synchronization signal. The communications manager 920 is capable of, configured to, or operable to support a means for transmitting communications to the second UE based on receiving the first and second portions of the synchronization signal.

Additionally, or alternatively, the communications manager 920 may support wireless communication at a first UE in accordance with examples as disclosed herein. For example, the communications manager 920 is capable of, configured to, or operable to support a means for receiving, from a second UE, a synchronization signal, the synchronization signal including at least a first primary synchronization signal symbol and a second primary synchronization signal symbol. The communications manager 920 is capable of, configured to, or operable to support a means for performing one or more operations to determine a cyclic shift applied to the first primary synchronization signal symbol, the second primary synchronization signal symbol, or both, in the time-domain. The communications manager 920 is capable of, configured to, or operable to support a means for transmitting communications to the second UE based on receiving the synchronization signal.

By including or configuring the communications manager 920 in accordance with examples as described herein, the device 905 may support techniques for improved communication reliability, more efficient utilization of communication resources, and improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of methods for communicating synchronization signals using cyclic shifts as described herein, or the processor 940 and the memory 930 may be otherwise configured to perform or support such operations.

Figure 10:
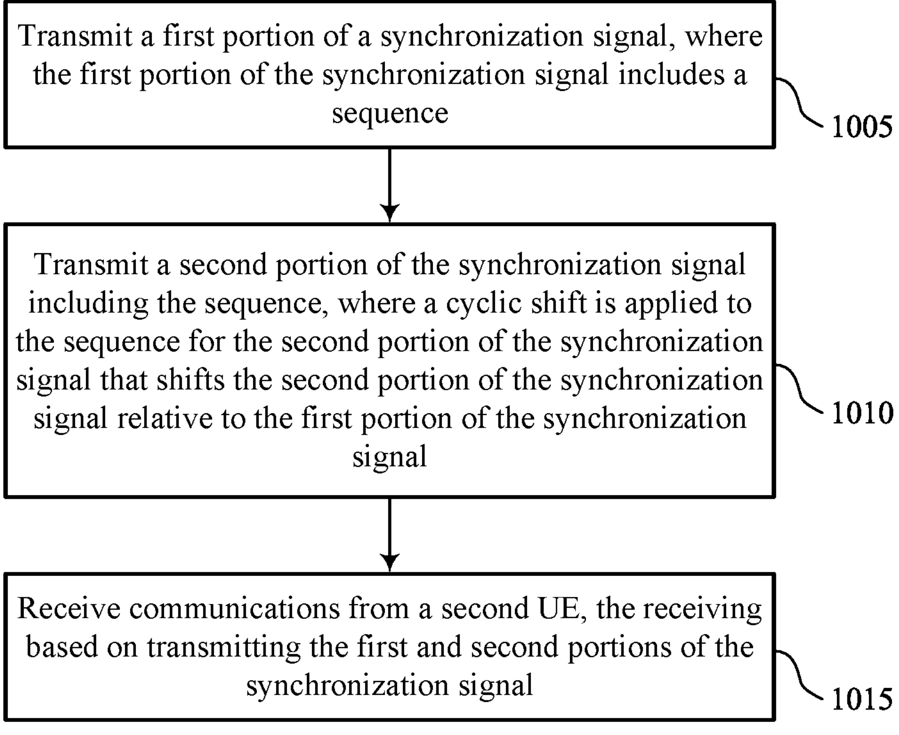
FIGS. 10 through 13 show flowcharts illustrating methods that support methods for communicating synchronization signals using cyclic shifts in accordance with one or more aspects of the present disclosure.

FIG. 10 shows a flowchart illustrating a method 1000 that supports methods for communicating synchronization signals using cyclic shifts in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1005, the method may include transmitting a first portion of a synchronization signal, where the first portion of the synchronization signal includes a sequence. The operations of 1005 may be performed in accordance with examples as disclosed herein. In some examples, aspects of the operations of 1005 may be performed by a synchronization signal first portion transmission manager 825 as described with reference to FIG. 8.

At 1010, the method may include transmitting a second portion of the synchronization signal including the sequence, where a cyclic shift is applied to the sequence for the second portion of the synchronization signal that shifts the second portion of the synchronization signal relative to the first portion of the synchronization signal. The operations of 1010 may be performed in accordance with examples as disclosed herein. In some examples, aspects of the operations of 1010 may be performed by a synchronization signal second portion transmission manager 830 as described with reference to FIG. 8.

At 1015, the method may include receiving communications from a second UE, the receiving based on transmitting the first and second portions of the synchronization signal. The operations of 1015 may be performed in accordance with examples as disclosed herein. In some examples, aspects of the operations of 1015 may be performed by a sidelink reception manager 835 as described with reference to FIG. 8.

Figure 11:
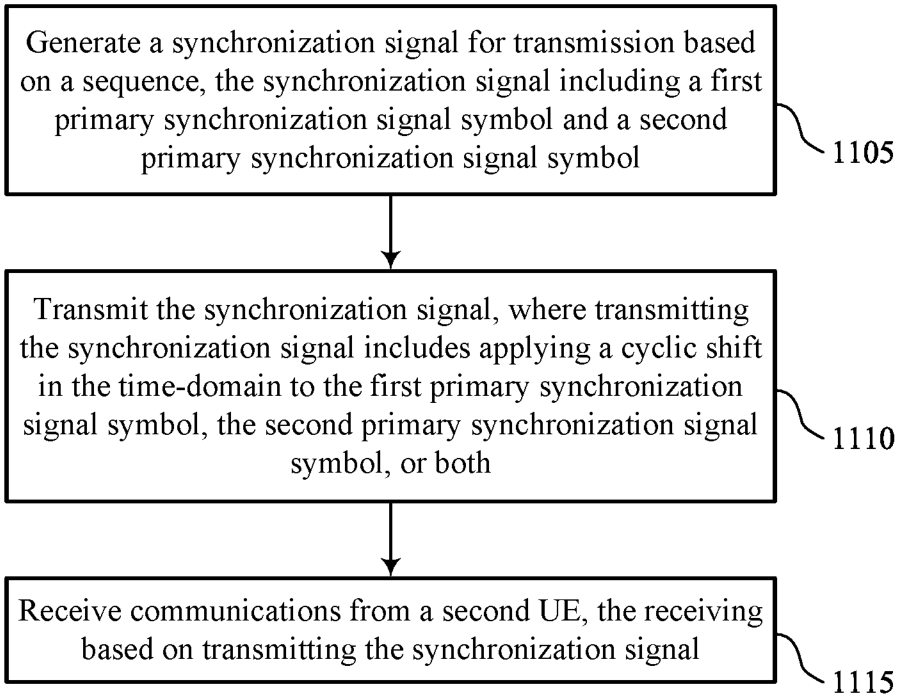

FIG. 11 shows a flowchart illustrating a method 1100 that supports methods for communicating synchronization signals using cyclic shifts in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1105, the method may include generating a synchronization signal for transmission based on a sequence, the synchronization signal including a first primary synchronization signal symbol and a second primary synchronization signal symbol. The operations of 1105 may be performed in accordance with examples as disclosed herein. In some examples, aspects of the operations of 1105 may be performed by a synchronization signal generation manager 840 as described with reference to FIG. 8.

At 1110, the method may include transmitting the synchronization signal, where transmitting the synchronization signal includes applying a cyclic shift in the time-domain to the first primary synchronization signal symbol, the second primary synchronization signal symbol, or both. The operations of 1110 may be performed in accordance with examples as disclosed herein. In some examples, aspects of the operations of 1110 may be performed by a synchronization signal transmission manager 845 as described with reference to FIG. 8.

At 1115, the method may include receiving communications from a second UE, the receiving based on transmitting the synchronization signal. The operations of 1115 may be performed in accordance with examples as disclosed herein. In some examples, aspects of the operations of 1115 may be performed by a sidelink reception manager 835 as described with reference to FIG. 8.

Figure 12:
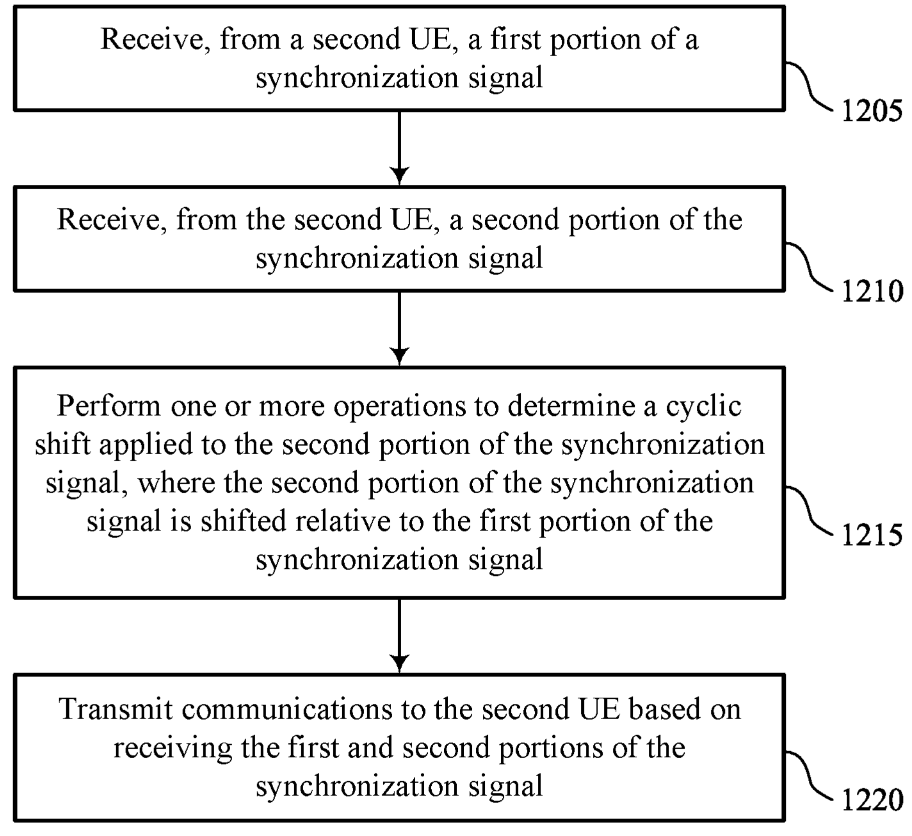

FIG. 12 shows a flowchart illustrating a method 1200 that supports methods for communicating synchronization signals using cyclic shifts in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1205, the method may include receiving, from a second UE, a first portion of a synchronization signal. The operations of 1205 may be performed in accordance with examples as disclosed herein. In some examples, aspects of the operations of 1205 may be performed by a synchronization signal first portion reception manager 850 as described with reference to FIG. 8.

At 1210, the method may include receiving, from the second UE, a second portion of the synchronization signal. The operations of 1210 may be performed in accordance with examples as disclosed herein. In some examples, aspects of the operations of 1210 may be performed by a synchronization signal second portion reception manager 855 as described with reference to FIG. 8.

At 1215, the method may include performing one or more operations to determine a cyclic shift applied to the second portion of the synchronization signal, where the second portion of the synchronization signal is shifted relative to the first portion of the synchronization signal. The operations of 1215 may be performed in accordance with examples as disclosed herein. In some examples, aspects of the operations of 1215 may be performed by a cyclic shift determination manager 860 as described with reference to FIG. 8.

At 1220, the method may include transmitting communications to the second UE based on receiving the first and second portions of the synchronization signal. The operations of 1220 may be performed in accordance with examples as disclosed herein. In some examples, aspects of the operations of 1220 may be performed by a sidelink transmission manager 865 as described with reference to FIG. 8.

Figure 13:
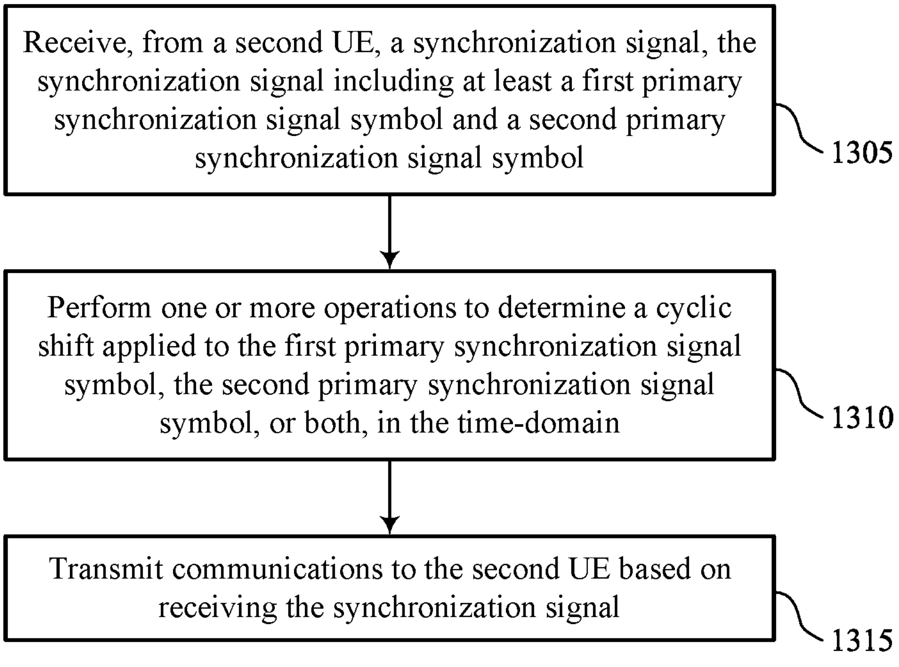

FIG. 13 shows a flowchart illustrating a method 1300 that supports methods for communicating synchronization signals using cyclic shifts in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the wireless UE to perform the described functions. Additionally, or alternatively, the wireless UE may perform aspects of the described functions using special-purpose hardware.

At 1305, the method may include receiving, from a second UE, a synchronization signal, the synchronization signal including at least a first primary synchronization signal symbol and a second primary synchronization signal symbol. The operations of 1305 may be performed in accordance with examples as disclosed herein. In some examples, aspects of the operations of 1305 may be performed by a synchronization signal reception manager 870 as described with reference to FIG. 8.

At 1310, the method may include performing one or more operations to determine a cyclic shift applied to the first primary synchronization signal symbol, the second primary synchronization signal symbol, or both, in the time-domain. The operations of 1310 may be performed in accordance with examples as disclosed herein. In some examples, aspects of the operations of 1310 may be performed by a cyclic shift determination manager 860 as described with reference to FIG. 8.

At 1315, the method may include transmitting communications to the second UE based on receiving the synchronization signal. The operations of 1315 may be performed in accordance with examples as disclosed herein. In some examples, aspects of the operations of 1315 may be performed by a sidelink transmission manager 865 as described with reference to FIG. 8.

The following provides an overview of aspects of the present disclosure:

Aspect 1: A method for wireless communication at a first UE, comprising: transmitting a first portion of a synchronization signal, wherein the first portion of the synchronization signal comprises a sequence; transmitting a second portion of the synchronization signal comprising the sequence, wherein a cyclic shift is applied to the sequence for the second portion of the synchronization signal that shifts the second portion of the synchronization signal relative to the first portion of the synchronization signal; and receiving communications from a second UE, the receiving based at least in part on transmitting the first and second portions of the synchronization signal.

Aspect 2: The method of aspect 1, wherein transmitting the first portion of the synchronization signal comprises transmitting the first portion of the synchronization signal without applying the cyclic shift to the sequence during the first portion of the synchronization signal.

Aspect 3: The method of any of aspects 1 through 2, further comprising: generating the cyclic shift using a function, wherein an output of the function comprises the cyclic shift.

Aspect 4: The method of aspect 3, wherein one or more bits associated with communications previously transmitted by the first UE, an identifier for the first UE, or both, are inputs for the function.

Aspect 5: The method of any of aspects 3 through 4, wherein the output of the function comprises a pseudo-random output.

Aspect 6: The method of any of aspects 1 through 5, further comprising: generating the cyclic shift based at least in part on one or more bits of a physical sidelink control channel communication previously transmitted by the first UE, an identifier for the first UE, or both.

Aspect 7: A method for wireless communication at a first UE, comprising: generating a synchronization signal for transmission based at least in part on a sequence, the synchronization signal comprising a first primary synchronization signal symbol and a second primary synchronization signal symbol; transmitting the synchronization signal, wherein transmitting the synchronization signal comprises applying a cyclic shift in the time-domain to the first primary synchronization signal symbol, the second primary synchronization signal symbol, or both; and receiving communications from a second UE, the receiving based at least in part on transmitting the synchronization signal.

Aspect 8: The method of aspect 7, wherein transmitting the synchronization signal comprises: applying the cyclic shift to the sequence during the first primary synchronization signal symbol and the second primary synchronization signal symbol.

Aspect 9: The method of aspect 7, wherein transmitting the synchronization signal comprises: applying the cyclic shift to the synchronization signal for one of the first primary synchronization signal symbol or the second primary synchronization signal symbol, wherein applying the cyclic shift shifts the synchronization signal for the one of the first primary synchronization signal symbol or the second primary synchronization signal symbol relative to the other of the first primary synchronization signal symbol or the second primary synchronization signal symbol.

Aspect 10: The method of any of aspects 7 through 9, further comprising: generating the cyclic shift using a function, wherein an output of the function comprises the cyclic shift.

Aspect 11: The method of aspect 10, wherein one or more bits associated with a sidelink broadcast channel communications or sidelink control channel communications are inputs for the function.

Aspect 12: The method of any of aspects 10 through 11, wherein the output of the function comprises a pseudo-random output.

Aspect 13: The method of any of aspects 7 through 12, further comprising: generating the cyclic shift based at least in part on one or more bits of a physical sidelink control channel communication previously transmitted by the first UE, an identifier for the first UE, or both.

Aspect 14: A method for wireless communication at a first UE, comprising: receiving, from a second UE, a first portion of a synchronization signal; receiving, from the second UE, a second portion of the synchronization signal; performing one or more operations to determine a cyclic shift applied to the second portion of the synchronization signal, wherein the second portion of the synchronization signal is shifted relative to the first portion of the synchronization signal; and transmitting communications to the second UE based at least in part on receiving the first and second portions of the synchronization signal.

Aspect 15: The method of aspect 14, wherein performing the one or more operations comprises: performing one or more autocorrelation operations to determine the cyclic shift.

Aspect 16: The method of any of aspects 14 through 15, further comprising: generating one or more hypotheses for the cyclic shift, wherein the one or more operations to determine the cyclic shift is based at least in part on respective correlations of the one or more hypotheses with the received synchronization signal.

Aspect 17: The method of any of aspects 14 through 16, wherein the cyclic shift is applied to the first portion of the synchronization signal and the second portion of the synchronization signal.

Aspect 18: The method of any of aspects 14 through 16, wherein the cyclic shift is applied to the synchronization signal for one of the first portion or the second portion, and applying the cyclic shift shifts the synchronization signal for the one of the first portion or the second portion relative to the other of the first portion or the second portion.

Aspect 19: A method for wireless communication at a first UE, comprising: receiving, from a second UE, a synchronization signal, the synchronization signal comprising at least a first primary synchronization signal symbol and a second primary synchronization signal symbol; performing one or more operations to determine a cyclic shift applied to the first primary synchronization signal symbol, the second primary synchronization signal symbol, or both, in the time-domain; and transmitting communications to the second UE based at least in part on receiving the synchronization signal.

Aspect 20: The method of aspect 19, further comprising: performing one or more autocorrelation operations to determine the cyclic shift.

Aspect 21: The method of any of aspects 19 through 20, further comprising: generating one or more hypotheses for the cyclic shift, wherein the one or more operations to determine the cyclic shift is based at least in part on respective correlations of the one or more hypotheses with the received synchronization signal.

Aspect 22: The method of any of aspects 19 through 21, wherein the cyclic shift is applied to the first primary synchronization signal symbol and the second primary synchronization signal symbol of the synchronization signal.

Aspect 23: The method of any of aspects 19 through 21, wherein the cyclic shift is applied to the synchronization signal for one of the first primary synchronization signal symbol or the second primary synchronization signal symbol, and the cyclic shift shifts the synchronization signal for the one of the first primary synchronization signal symbol or the second primary synchronization signal symbol relative to the other of the first primary synchronization signal symbol or the second primary synchronization signal symbol.

Aspect 24: An apparatus for wireless communication at a first UE, comprising a processor; memory coupled with the processor; and instructions stored in the memory and executable by the processor to cause the apparatus to perform a method of any of aspects 1 through 6.

Aspect 25: An apparatus for wireless communication at a first UE, comprising at least one means for performing a method of any of aspects 1 through 6.

Aspect 26: A non-transitory computer-readable medium storing code for wireless communication at a first UE, the code comprising instructions executable by a processor to perform a method of any of aspects 1 through 6.

Aspect 27: An apparatus for wireless communication at a first UE, comprising a processor; memory coupled with the processor; and instructions stored in the memory and executable by the processor to cause the apparatus to perform a method of any of aspects 7 through 13.

Aspect 28: An apparatus for wireless communication at a first UE, comprising at least one means for performing a method of any of aspects 7 through 13.

Aspect 29: A non-transitory computer-readable medium storing code for wireless communication at a first UE, the code comprising instructions executable by a processor to perform a method of any of aspects 7 through 13.

Aspect 30: An apparatus for wireless communication at a first UE, comprising a processor; memory coupled with the processor; and instructions stored in the memory and executable by the processor to cause the apparatus to perform a method of any of aspects 14 through 18.

Aspect 31: An apparatus for wireless communication at a first UE, comprising at least one means for performing a method of any of aspects 14 through 18.

Aspect 32: A non-transitory computer-readable medium storing code for wireless communication at a first UE, the code comprising instructions executable by a processor to perform a method of any of aspects 14 through 18.

Aspect 33: An apparatus for wireless communication at a first UE, comprising a processor; memory coupled with the processor; and instructions stored in the memory and executable by the processor to cause the apparatus to perform a method of any of aspects 19 through 23.

Aspect 34: An apparatus for wireless communication at a first UE, comprising at least one means for performing a method of any of aspects 19 through 23.

Aspect 35: A non-transitory computer-readable medium storing code for wireless communication at a first UE, the code comprising instructions executable by a processor to perform a method of any of aspects 19 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components (e.g., individually or collectively). For example, a component introduced with the article "a" shall be understood to mean "one or more components," and referring to "the component" subsequently in the claims shall be understood to be equivalent to referring to "the one or more components, individually or collectively"

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:

a processor;

memory coupled with the processor; and instructions stored in the memory and executable by the processor to cause the apparatus to:

transmit a first portion of a synchronization signal, wherein the first portion of the synchronization signal comprises a sequence;

transmit a second portion of the synchronization signal comprising the sequence, wherein a cyclic shift is applied to the sequence in the time-domain for the second portion of the synchronization signal that shifts the second portion of the synchronization signal relative to the first portion of the synchronization signal; and receive communications from a second UE, the receiving based at least in part on transmitting the first and second portions of the synchronization signal.

2. The apparatus of claim 1, wherein the instructions to transmit the first portion of the synchronization signal are executable by the processor to cause the apparatus to:

transmit the first portion of the synchronization signal without applying the cyclic shift to the sequence during the first portion of the synchronization signal, wherein the synchronization signal comprises the first portion without the cyclic shift applied and the second portion with the cyclic shift applied.

3. The apparatus of claim 1, wherein the instructions are further executable by the processor to cause the apparatus to:

generate the cyclic shift using a function, wherein an output of the function comprises the cyclic shift.

4. The apparatus of claim 3, wherein one or more bits associated with communications previously transmitted by the first UE, an identifier for the first UE, or both, are inputs for the function.

5. The apparatus of claim 3, wherein the output of the function comprises a pseudo-random output.

6. The apparatus of claim 1, wherein the instructions are further executable by the processor to cause the apparatus to:

generate the cyclic shift based at least in part on one or more bits of a physical sidelink control channel communication previously transmitted by the first UE, an identifier for the first UE, or both.

7. An apparatus for wireless communication at a first user equipment (UE), comprising:

a processor;

memory coupled with the processor; and instructions stored in the memory and executable by the processor to cause the apparatus to:

generate a synchronization signal for transmission based at least in part on a sequence, the synchronization signal comprising a first primary synchronization signal symbol and a second primary synchronization signal symbol;

transmit the synchronization signal, wherein transmitting the synchronization signal comprises applying a cyclic shift in the time-domain to the first primary synchronization signal symbol, the second primary synchronization signal symbol, or both; and receive communications from a second UE, the receiving based at least in part on transmitting the synchronization signal.

8. The apparatus of claim 7, wherein the instructions to transmit the synchronization signal are executable by the processor to cause the apparatus to:

apply the cyclic shift to the sequence during the first primary synchronization signal symbol and the second primary synchronization signal symbol.

9. The apparatus of claim 7, wherein the instructions to transmit the synchronization signal are executable by the processor to cause the apparatus to:

apply the cyclic shift to the synchronization signal for one of the first primary synchronization signal symbol or the second primary synchronization signal symbol, wherein applying the cyclic shift shifts the synchronization signal for the one of the first primary synchronization signal symbol or the second primary synchronization signal symbol relative to the other of the first primary synchronization signal symbol or the second primary synchronization signal symbol.

10. The apparatus of claim 7, wherein the instructions are further executable by the processor to cause the apparatus to:

generate the cyclic shift using a function, wherein an output of the function comprises the cyclic shift.

11. The apparatus of claim 10, wherein one or more bits associated with a sidelink broadcast channel communications or sidelink control channel communications are inputs for the function.

12. The apparatus of claim 10, wherein the output of the function comprises a pseudo-random output.

13. The apparatus of claim 7, wherein the instructions are further executable by the processor to cause the apparatus to:

generate the cyclic shift based at least in part on one or more bits of a physical sidelink control channel communication previously transmitted by the first UE, an identifier for the first UE, or both.

14. An apparatus for wireless communication at a first user equipment (UE), comprising:

a processor;

memory coupled with the processor; and instructions stored in the memory and executable by the processor to cause the apparatus to:

receive, from a second UE, a first portion of a synchronization signal;

receive, from the second UE, a second portion of the synchronization signal;

perform one or more operations to determine a cyclic shift applied to the second portion of the synchronization signal in the time-domain, wherein the second portion of the synchronization signal is shifted relative to the first portion of the synchronization signal; and transmit communications to the second UE based at least in part on receiving the first and second portions of the synchronization signal.

15. The apparatus of claim 14, wherein the instructions to perform the one or more operations are executable by the processor to cause the apparatus to:

perform one or more autocorrelation operations to determine the cyclic shift.

16. The apparatus of claim 14, wherein the instructions are further executable by the processor to cause the apparatus to:

generate one or more hypotheses for the cyclic shift, wherein the one or more operations to determine the cyclic shift is based at least in part on respective correlations of the one or more hypotheses with the received synchronization signal.

17. The apparatus of claim 14, wherein the cyclic shift is applied to the first portion of the synchronization signal and the second portion of the synchronization signal.

18. The apparatus of claim 14, wherein:

the cyclic shift is applied to the synchronization signal for one of the first portion or the second portion, and applying the cyclic shift shifts the synchronization signal for the one of the first portion or the second portion relative to the other of the first portion or the second portion.

19. An apparatus for wireless communication at a first user equipment (UE), comprising:

a processor;

memory coupled with the processor; and instructions stored in the memory and executable by the processor to cause the apparatus to:

receive, from a second UE, a synchronization signal, the synchronization signal comprising at least a first primary synchronization signal symbol and a second primary synchronization signal symbol;

perform one or more operations to determine a cyclic shift applied to the first primary synchronization signal symbol, the second primary synchronization signal symbol, or both, in the time-domain; and transmit communications to the second UE based at least in part on receiving the synchronization signal.

20. The apparatus of claim 19, wherein the instructions are further executable by the processor to cause the apparatus to:

perform one or more autocorrelation operations to determine the cyclic shift.

21. The apparatus of claim 19, wherein the instructions are further executable by the processor to cause the apparatus to:

generate one or more hypotheses for the cyclic shift, wherein the one or more operations to determine the cyclic shift is based at least in part on respective correlations of the one or more hypotheses with the received synchronization signal.

22. The apparatus of claim 19, wherein the cyclic shift is applied to the first primary synchronization signal symbol and the second primary synchronization signal symbol of the synchronization signal.

23. The apparatus of claim 19, wherein:

the cyclic shift is applied to the synchronization signal for one of the first primary synchronization signal symbol or the second primary synchronization signal symbol, and the cyclic shift shifts the synchronization signal for the one of the first primary synchronization signal symbol or the second primary synchronization signal symbol relative to the other of the first primary synchronization signal symbol or the second primary synchronization signal symbol.

* * * * *